(12) United States Patent
Rump

(10) Patent No.: US 12,299,818 B2
(45) Date of Patent: May 13, 2025

(54) VISUALIZING THE APPEARANCE OF AT LEAST TWO MATERIALS IN A HETERGENEOUS MEASUREMENT ENVIRONMENT

(71) Applicant: X-RITE EUROPE GMBH, Regensdorf (CH)

(72) Inventor: Martin Rump, Winderscheid (DE)

(73) Assignee: X-RITE BUROPE GMBH, Regensdorf (CH)

( * ) Notice: Subject to any disclaimer, the term of this patent is extended or adjusted under 35 U.S.C. 154(b) by 121 days.

(21) Appl. No.: 18/015,006

(22) PCT Filed: Jul. 7, 2021

(86) PCT No.: PCT/IB2021/056091
§ 371 (c)(1),
(2) Date: Jan. 6, 2023

(87) PCT Pub. No.: WO2022/009115
PCT Pub. Date: Jan. 13, 2022

(65) Prior Publication Data
US 2023/0237738 A1    Jul. 27, 2023

Related U.S. Application Data

(60) Provisional application No. 63/127,535, filed on Dec. 18, 2020.

(30) Foreign Application Priority Data

Jul. 7, 2020  (EP) ..................................... 20184560

(51) Int. Cl.
G06T 15/00   (2011.01)
G06T 7/41   (2017.01)
(Continued)

(52) U.S. Cl.
CPC ................ *G06T 17/10* (2013.01); *G06T 7/41* (2017.01); *G06T 7/60* (2013.01); *G06T 7/90* (2017.01);
(Continued)

(58) Field of Classification Search
CPC . G06T 17/10; G06T 7/41; G06T 2207/10024; G06T 7/60; G06T 2215/16;
(Continued)

(56) References Cited

U.S. PATENT DOCUMENTS 8,872,811 B1   10/2014 Rump et al.
11,080,552 B2 *   8/2021 Steenhoek ................ G06T 7/90
(Continued)

FOREIGN PATENT DOCUMENTS

EP       2833327       10/2018
WO    2020200982       10/2020
WO    2022002676        1/2022

OTHER PUBLICATIONS

Kirchner E, van den Kieboom GJ, Njo L, Super R, Gottenbos R. Observation of visual texture of metallic and pearlescent materials. Color Research & Application. Aug. 2007; 32(4):256-66.*
(Continued)

*Primary Examiner* — Phu K Nguyen
(74) *Attorney, Agent, or Firm* — Hahn Loeser & Parks, LLP

(57) ABSTRACT

A computer-implemented method for visualizing the appearances of at least two materials includes obtaining a first set of appearance attributes, the appearance attributes of the first set being associated with a first material, the first set of appearance attributes comprising measured appearance attributes, obtaining a second set of appearance attributes, the appearance attributes of the second set being associated with a second material; and obtaining a geometric model of at
(Continued)

least one virtual object, the geometric model defining a three-dimensional macroscopic surface geometry of the virtual object. The invention is characterized by synthesizing a third set of appearance attributes from the first set of appearance attributes and the second set of appearance attributes and visualizing, using a display device, a scene comprising the at least one virtual object, using the third set of appearance attributes, a comparison set of appearance attributes and the geometric model, a first portion of the at least one virtual object being visualized using the third set of appearance attributes, and a second portion of the at least one virtual object being visualized using the comparison set of appearance attributes, to allow a direct a visual comparison of the first set of appearance attributes as modified by the second set of appearance attributes with the comparison set of appearance attributes.

19 Claims, 13 Drawing Sheets

(51) Int. Cl.

| | | |
|---|---|---|
| *G06T 7/60* | (2017.01) | |
| *G06T 7/90* | (2017.01) | |
| *G06T 11/00* | (2006.01) | |
| *G06T 15/04* | (2011.01) | |
| *G06T 15/50* | (2011.01) | |
| *G06T 17/10* | (2006.01) | |
| *G06T 19/20* | (2011.01) | |
| *G06V 10/141* | (2022.01) | |
| *G06V 10/56* | (2022.01) | |
| *G06V 10/74* | (2022.01) | |

(52) U.S. Cl.
CPC ............ *G06T 11/001* (2013.01); *G06T 15/04* (2013.01); *G06T 15/506* (2013.01); *G06T 19/20* (2013.01); *G06V 10/141* (2022.01); *G06V 10/56* (2022.01); *G06V 10/761* (2022.01); *G06T 2207/10024* (2013.01); *G06T 2215/16* (2013.01); *G06T 2219/2012* (2013.01)

(58) Field of Classification Search
CPC ............ G06T 2219/2012; G06T 15/04; G06T 15/506; G06T 11/001; G06T 19/20; G06T 7/90; G06V 10/56; G06V 10/761; G06V 10/141; G01J 3/0291; G01J 3/0218; G01J 3/501; G01J 3/0264; G01J 3/504
USPC ......................................................... 345/418
See application file for complete search history.

(56) References Cited

U.S. PATENT DOCUMENTS

| | | | |
|---|---|---|---|
| 2008/0158239 A1 | 7/2008 | Lamy et al. | |
| 2015/0032430 A1 | 1/2015 | Rump et al. | |
| 2020/0089991 A1 | 3/2020 | Steenhoek | |
| 2023/0237738 A1* | 7/2023 | Rump .................. | G06V 10/141 |
| | | | 345/419 |
| 2023/0260193 A1* | 8/2023 | Rump ..................... | G06T 5/70 |
| | | | 345/419 |
| 2023/0260237 A1* | 8/2023 | Rump ..................... | G06T 15/04 |
| | | | 345/426 |
| 2023/0277065 A1* | 9/2023 | Islam ................... | A61B 5/1455 |
| | | | 433/29 |
| 2023/0343051 A1* | 10/2023 | Rump .................... | G06F 3/011 |
| 2024/0130621 A1* | 4/2024 | Islam .................... | G01N 33/02 |

OTHER PUBLICATIONS

"Photo-realistic Rendering of Metallic Car Paint from Image-Based Measurements," Martin Rump et al., EUROGRAPHICS 2008, vol. 27 (2008), No. 2 (10 pgs.).
Filip J et al: "Bidirectional Texture Function Modeling: A State of the Art Survey", IEEE Transactions on Pattern Analysis and Machine Intelligence, IEEE Computer Society, USA, vol. 30, No. 11, Nov. 2009 (Nov. 2009), pp. 1921-1940, XP011292829.
Martin Rump et al: "Photo-realistic Rendering of Metallic Car Paint from Image-Based Measurements", Computer Graphics Forum, vol. 27, No. 2, Apr. 2008 (Apr. 2008), pp. 527-536, XP055135082.
Hendrik P. A. Lensch et al: "Image-Based Reconstruction of Spatially Varying Materials : Proceedings of the Eurographics Workshop in London, United Kingdom, Jun. 25-27, 2001" In: "Eurographics", 2001, Springer Verlag, Vienna, AT, XP055752325.
International Search Report regarding PCT/IB2021/056091, Mailed Oct. 8, 2021 (4 pgs.).
Written Opinion of the International Searching Authority regarding PCT/IB2021/056091, Mailed Oct. 8, 2021 (8 pgs.).

* cited by examiner

VISUALIZING THE APPEARANCE OF AT LEAST TWO MATERIALS IN A HETERGENEOUS MEASUREMENT ENVIRONMENT

CROSS-REFERENCE TO RELATED APPLICATIONS

The present application is a US National Phase of International Patent Application serial number PCT/IB2021/056091, filed Jul. 7, 2021, entitled "VISUALIZING THE APPEARANCE OF AT LEAST TWO MATERIALS IN A HETEROGENEOUS MEASUREMENT ENVIRONMENT,"; which claims priority to and the benefit of U.S. Provisional Application No. 63/127,535, our matter 218193.00041, filed Dec. 18, 2020, entitled "VISUALIZING THE APPEARANCE OF AT LEAST TWO MATERIALS IN A HETEROGENEOUS MEASUREMENT ENVIRONMENT,"; and also the benefit of European Regional application EP20184560.9, filed Jul. 7, 2020, entitled "VISUALIZING THE APPEARANCE OF AT LEAST TWO MATERIALS IN A HETEROGENEOUS MEASUREMENT ENVIRONMENT."

TECHNICAL FIELD

The present invention relates to a method of visualizing the appearances of at least two materials. The invention further relates to a device for carrying out such a method and to a corresponding computer program.

PRIOR ART

Finding a color formulation that matches a given color of a physical object to be color matched ("target object") can be a tedious process of trial and error. A set of colorants is chosen, a candidate recipe using the colorants is retrieved or formulated, and a trial object, such as a test panel, is prepared by applying material prepared according to the candidate recipe to the trial object. The trial object is then visually compared to the target object. If the color of the trial object does not match the color of the target object, the candidate recipe is iteratively modified as often as necessary until the color of the trial object matches the color of the target object to within the desired tolerances.

In some applications, the target object may be a vehicle part that is coated with an existing coating, and it is desired to find a coating formulation whose color matches the appearance of the existing coating. Even if a paint code or Vehicle Identification Number associated with the target object is known, merely retrieving a corresponding reference recipe may not yield an acceptable match. This is because, even if a paint code specification and reference recipe exist, the color of a given target object will vary slightly from batch to batch, formulator to formulator, or year to year. Modifications to reference recipes need to be considered.

Traditionally, the process of finding a matching recipe has been an entirely manual process. Whether formulating from scratch or modifying a reference recipe, success largely depends on the experience of the color professional who selects the colorants and defines the candidate recipes. Even experienced specialists often need several iterations until a satisfactory match is obtained.

Over the last few decades, increasingly sophisticated color formulation software has been introduced to aid the color professional in obtaining a color formulation within defined tolerances with fewer iterations. Examples include the software "Color iMatch™" available from X-Rite Inc., Grand Rapids, MI, USA, the software "PaintManager" available from PPG Industries, Strongsville, OH, USA, the software "Match Pigment" available from Datacolor, Lawrenceville, NJ, USA, or the software "Colibri™ ColorMatch" available from Konica Minolta, Inc., Osaka, Japan. Color formulation software normally has three main components (see, e.g., [Ber19]): The first is a database of optical properties of the colorants. The second is a set of algorithms that select the colorants and predict a candidate recipe. The third is a set of algorithms that correct the initial candidate recipe when the match is not within tolerance.

For filling the database with optical properties of the colorants, the optical properties need to be determined by measurements. This can be done in different ways, depending on the type of envisaged application. For instance, for coatings as they are typically used in the automobile industry, mixes of each colorant with a base formulation at different concentrations and possibly with different amounts of added white and black pigments may be prepared, and a reference object in the form of a so-called drawdown may be created for each mix (e.g., in the form of a black-and-white opacity card coated with the mix). Color attributes of the drawdowns in the form of spectral data or in a predefined color space (e.g., in the form of trichromatic values or CIELAB values) may then be determined, using an instrument like a spectrophotometer, and may be fed to the database.

For carrying out color matching to a physical target object, color attributes of the target object are likewise determined. The formulation software then predicts one or more candidate recipes that are expected to yield approximately the same color attributes as the target object. For assessing the quality of the match, a trial object (e.g., a drawdown in the case of a coating) may be created for a selected candidate recipe. The trial object may then be visually compared to the target object. If the match is visually not yet satisfactory, color attributes of the trial object may be acquired, and the color formulation software may correct the recipe based on a comparison of the computed color attributes of the candidate recipe and the measured color attributes of the trial object. The process may be repeated as often as necessary until an acceptable match is obtained.

While often acceptable results may be obtained in this manner with fewer iterations than with traditional manual methods, there is still room for improvement. In particular, it is desirable to be able to judge the quality of a match between a candidate recipe and a target object with improved confidence already before a trial object has been actually produced. This is particularly desirable if the location where the trial object is produced is not identical with the location where the target object is located. For instance, the target object may be a part of a damaged vehicle that needs to be repaired in a body shop. However, the body shop might not be equipped with a color mixing facility itself. Rather, the body shop might have to order paint ready to be sprayed from a remote paint supplier. In such cases, a match to within tolerances at the first shot may be essential.

Known methods of color matching may not yield satisfactory results, especially with paint coatings or other materials that exhibit gonioapparent properties. For instance, some materials exhibit a color flop. "Color flop" is a change in the color value, hue or chroma in the appearance of a material when illumination and viewing directions change. Other examples of materials having gonioapparent properties are materials that contain effect pigments like metallic flakes, which create a sparkle effect, or interference flakes, which create a pearlescent effect, and materials that have a non-planar surface microstructure. In such cases, it may not be sufficient to just match colors. Rather, entire appearances need to be matched, including angle-dependent color and texture. Known techniques often fail to provide satisfactory visualizations or measurements to accurately match the appearance of such materials.

US20150032430A1 discloses a method of digitally generating, via the use of a computer, data indicative of a synthesized appearance of a simulated material having physically plausible appearance attributes. The method includes determining a set of data indicative of the synthesized appearance of the simulated material based at least in part on data associated with the physically tangible source material and at least in part on data of measured attributes of the physically tangible reference material.

US20150026298A1 discloses a method of selecting the most probable variant of a matching paint candidate color standard for vehicle repair using a mobile device. In this method, a user at a body shop enters information about the color of the vehicle into the mobile device and transmits the information to a remote central computer. The central computer selects a candidate color standard and transmits information about the candidate color standard to the mobile device. The mobile device displays information about the selected candidate color standard. The user visually compares a physical chip that represents the selected candidate color standard with the color of the vehicle to be repaired. This method is disadvantageous in that physical chips of a large number of color standards are required at the body shop. Optionally, images of the selected candidate color standard are displayed on a color display of the mobile device, and the user visually compares the displayed images with the color of the vehicle to be repaired. This, however, requires that the display is carefully calibrated in order to enable a meaningful comparison.

US20070097119A1 discloses a method for displaying a simulated paint coating on a display device. RGB color values are calculated over a range of aspecular angles. A statistical texture function of the paint coating is determined. The statistical texture function is applied to the RGB values, and color pixels are displayed using these values. The statistical texture function does not depend on illumination and viewing directions.

US20050128484A1 discloses a method for determining a color-matched repair paint formula. Color characteristics of a target color to be matched are identified, inputted, and processed in such way as to enable a visual display of the target color. Alternate colors are selected from a database. An alternate color may be displayed on the display in several virtual chips, each virtual chip representing a different viewing angle, or as a curved panel. Images showing flake appearance characteristics may be superimposed with the color. The virtual chips may be viewed in combination with the target color. Color and images obtained for a plurality of aspecular angles may be interpolated to show the change in flake appearance as aspecular angle changes. The document is silent about how color and flake appearance are interpolated.

US20080291449A1 and US20080235224A1 both disclose methods for displaying images to select a matching formula to match the appearance of an article such as a target coating of a vehicle. In one embodiment, color data of the article is obtained using a colorimeter or spectrophotometer. Texture data of the article is obtained using an imaging device. A target image is created based on the color and texture data, and the target image is displayed on a display device. A preliminary matching formula is manually retrieved from a database. A matching image is generated for the preliminary matching formula. The matching image is displayed on the display device side by side with the target image. The target image and the matching image may be displayed for multiple aspecular angles. The documents are silent about how texture data is generated and displayed for the multiple aspecular angles.

US20200089991A1 discloses a system for displaying one or more images to select one or more matching formulas to match appearance of a target coating of an article. A first database contains repair formulas and associated appearance characteristics. A second database contains identification information or three-dimensional geometric data of at least one article. A preliminary matching formula is retrieved from the first database, an article or its three-dimensional geometric data is selected from the second database, and a marked section of the surface of the article is received. Individual matching images containing the marked section and an unmarked section adjacent to the marked section are generated, and the individual matching images are displayed on a display device. In the marked section, the individual matching images are generated based on the appearance characteristics of the preliminary matching formula. In the unmarked section, the individual matching images are generated based on the appearance characteristic of the article. The appearance characteristics are computed from images acquired from the article using an imaging device. The appearance characteristics may comprise texture, metallic or pearlescent effect, gloss, distinctness of image, flake appearances such as texture, sparkle, glint and glitter, and enhancement of depth perception imparted by the flakes. The document does not specify in which manner the appearance of the article is displayed for different illumination and viewing directions.

U.S. Pat. No. 8,872,811 B1 discloses a method of digitally generating data indicative of a synthesized appearance of a simulated material having physically plausible appearance attributes. A set of data indicative of the synthesized appearance of the simulated material is determined based in part on data associated with a physically tangible source material and in part on data of measured attributes of a physically tangible reference material.

US 2007291993A1 discloses an apparatus for measuring a spatially under-sampled Bidirectional Reflectance Distribution Function (BRDF) of a surface.

SUMMARY OF THE INVENTION

It is an object of the present invention to provide a method of visualizing the appearances of a target material comprised in a target object and of a candidate material for which a recipe has been determined by formulation software in such a manner that a user can determine with improved confidence whether the appearances of the materials match, without a need of producing physical trial objects.

In a preferred embodiment, a computer-implemented method for visualizing the appearances of at least two materials includes obtaining a first set of appearance attributes, the appearance attributes of the first set being associated with a first material, the first set of appearance attributes comprising measured appearance attributes, obtaining a second set of appearance attributes, the appearance attributes of the second set being associated with a second material; and obtaining a geometric model of at least one virtual object, the geometric model defining a three-dimensional macroscopic surface geometry of the virtual object. The invention is characterized by synthesizing a third set of appearance attributes from the first set of appearance attributes and the second set of appearance attributes and visualizing, using a display device, a scene comprising the at least one virtual object, using the third set of appearance attributes, a comparison set of appearance attributes and the geometric model, a first portion of the at least one virtual object being visualized using the third set of appearance attributes, and a second portion of the at least one virtual object being visualized using the comparison set of appearance attributes, to allow a direct a visual comparison of the first set of appearance attributes as modified by the second set of appearance attributes with the comparison set of appearance attributes.

In one example, the first set of appearance attributes comprises color attributes but lacks texture attributes, the second set of appearance attributes comprises both color attributes and texture attributes, and the third set of appearance attributes comprises a synthesis of color attributes from the first set of appearance attributes and texture attributes from the second set of appearance attributes.

In another example, the first set of appearance attributes comprises a first plurality of color attributes corresponding to a first plurality of optical measurement geometries, the second set of appearance attributes comprises a second plurality of color attributes corresponding to a second plurality of optical measurement geometries, the second plurality of measurement geometries being greater than the first plurality of measurement geometries; and the third set of appearance attributes comprises a synthesis of color attributes from the first plurality of color attributes and the second plurality of color attributes. In the third set of appearance attributes, the first plurality of color attributes may be substituted for color attributes of the second plurality of color attributes at measurement geometries that match the first set of color attributes. In one example, the color attributes of the second plurality of color attributes that are not replaced by the first plurality of color attributes are corrected to adjust for a color difference between the replacing color attributes and the replaced color attributes.

In some embodiments, the method further comprises generating a first instance of an appearance model, the first instance of the appearance model comprising the third set of appearance attributes, and generating a second instance of the appearance model, the second instance of the appearance model comprising the comparison set of appearance attributes. The appearance model comprises a discrete texture table comprising a plurality of destination textures, each destination texture being represented by image data and being associated with a different set of destination coordinates, the set of destination coordinates being indicative of a particular combination of illumination and viewing directions, and the first and second instances of the appearance model being used for visualizing the at least one virtual object. The step of generating the first instance of the appearance model may further comprise at least one of the following operations: interpolating between available appearance attributes at different combinations of illumination and viewing directions; and extrapolating from available appearance attributes at selected combinations of illumination and viewing directions. In this example, the available appearance attributes comprise appearance attributes from the third set of appearance attributes.

In one example of this embodiment, the first material comprises a target automotive paint and the first set of appearance attributes comprises measured appearance attributes of the target automotive paint; the second material comprises a reference automotive paint and the second set of appearance attributes comprises measured appearance attributes of the reference automotive paint; and the comparison set of appearance attributes comprises the second set of appearance attributes.

In another example of this embodiment, the first material comprises a target automotive paint and the first set of appearance attributes comprises measured appearance attributes of the target automotive paint; the second material comprises a candidate recipe for automotive paint and the second set of appearance attributes comprises calculated appearance attributes of the candidate recipe; and the comparison set of appearance attributes comprises the second set of appearance attributes.

In another example of this embodiment, the first material comprises a test object automotive paint and the first set of appearance attributes comprises measured appearance attributes of the test object; and the second material comprises a reference automotive paint and the second set of appearance attributes comprises measured appearance attributes (54) of the reference automotive paint; and the comparison set of appearance attributes comprises the second set of appearance attributes.

In another example of this embodiment, the first material comprises a candidate automotive paint formulation and the first set of appearance attributes comprises measured appearance attributes of the candidate automotive paint formulation; the second material comprises a target automotive paint and the second set of appearance attributes comprises measured appearance attributes of the target automotive paint and the comparison set of appearance attributes comprises the second set of appearance attributes.

The third set of appearance attributes may further comprise appearance attributes from a fourth set of appearance attributes. In one example, the fourth set of appearance attributes comprises appearance attributes from a drawdown of one or more pigments associated with a paint formulation.

In another example, the second set of appearance attributes comprises appearance attributes from a drawdown of one or more pigments associated with a paint formulation. In another example, the first material comprises a target automotive paint and the paint formulation comprises a reference standard for the target automotive paint. In another example, the second set of appearance attributes comprises calculated appearance attributes corresponding to one or more pigments associated with a paint formulation.

The term "appearance" as used in the present disclosure includes both color and texture, "texture" being broadly understood as describing spatial variations of appearance across the surface of an object.

Texture can strongly depend on the illumination and viewing directions. For instance, in metallic effect paints, which typically contain highly reflecting flakes, the surface positions where strong reflectance is observed can change non-continuously when the illumination and/or viewing directions are continuously changed because flakes at different positions across the surface will reflect at different combinations of illumination and viewing directions. Therefore, observed textures may be highly dissimilar between illumination and viewing directions that differ by only small angular values. The present invention is therefore particularly useful for matching materials that contain reflective flakes.

The first set of appearance attributes, which in some embodiments are associated with the target material, may comprise measured appearance attributes of the target material. The presently proposed method may comprise a step of actually carrying out measurements of the target object that comprises the target material, using an appearance capture device.

The second set of appearance attributes, which in some embodiments are associated with the candidate material, may comprise candidate appearance attributes. In some embodiments, the candidate material is a known reference material, and accordingly the candidate appearance attributes are appearance attributes associated with the known reference material. In other embodiments, the candidate material is composed of a plurality of constituent materials, and appearance attributes may be available for a plurality of reference materials that comprise the constituent materials of the candidate material. Accordingly, the candidate appearance attributes can be based on predetermined appearance attributes associated with a plurality of reference materials, using calculations. The recipe may be determined in such a manner that the candidate material has expected appearance attributes that at least approximately match the appearance attributes of the target material. In particular, the presently proposed method may comprise a step of determining the recipe. This may involve minimizing a difference measure between expected appearance attributes of the candidate material and the measured appearance attributes of the target material. Suitable difference measures and optimization algorithms are well known in the art of color formulation.

In some embodiments, the method further comprises obtaining a physical, tangible trial object that comprises the candidate material, e.g., by producing the trial object. The method may comprise determining measured appearance attributes of the trial object by carrying out measurements on the trial object, using an appearance capture device. The method may further comprise visualizing at least a portion of the at least one virtual object using the measured appearance attributes of the trial object. In this manner, the appearance of the trial object can be compared to the appearance of the target object even if the target object is not present at the same location as the trial object. In addition or in the alternative, the method may comprise determining an amended recipe, using the measured appearance attributes of the trial object and the calculated appearance attributes of the candidate material. Suitable algorithms for determining an amended recipe once the measured appearance attributes of the trial object are available are well known in the art of color formulation. Such algorithms are often called "correction algorithms". The method may then be repeated with the amended recipe.

The appearance capture device that is used for determining the measured appearance attributes of the trial object may be the same device as the device used for determining the measured appearance attributes of the target object, or it may be a different device. The device is preferably configured to determine the same types of appearance attributes under the same pairs of illumination and viewing conditions as the appearance capture device used for the target object. However, it is also conceivable that the appearance capture device that is used for the trial object is configured to determine different types of appearance attributes, a different number of appearance attributes, and/or appearance attributes for different pairs of illumination and viewing directions than the appearance capture device that is used for the target object.

In each case, the appearance capture device may be a multi-angle spectrophotometer, which is configured to determine color attributes for a plurality of combinations of illumination and viewing directions. The appearance capture device may further have imaging capabilities to determine texture attributes in addition to color attributes.

In some embodiments, the measured appearance attributes of the target material comprise a plurality of sets of measured image data, each set of measured image data associated with a different combination (e.g., pair) of illumination and viewing directions. To this end, the appearance capture device used for determining the appearance attributes of the target material may comprise one or more cameras configured to determine image data for a plurality of combinations (e.g., pairs) of illumination and viewing directions. In some embodiments, all combinations of illumination and viewing directions for the measured image data comprise the same viewing direction, but a plurality of different illumination directions (or, equivalently, the same illumination direction and a plurality of different viewing directions). This may be the case, e.g., when an appearance capture device having a single camera and a plurality of different light sources is used. In other embodiments, the combinations of illumination and viewing directions comprise two or more viewing directions.

In some embodiments, the measured appearance attributes of the target material may lack texture attributes or may contain only a limited set of texture attributes. This situation may occur, for instance, if the appearance capture device used for measuring the target object lacks imaging capabilities or has only very limited imaging capabilities. In this case, the measured appearance attributes of the target material may be complemented by texture attributes from a different source. In particular, the first set of appearance attributes (i.e., the set associated with the target material) may comprise texture attributes, in particular, in the form of image data, that have been determined based on texture attributes associated with one or more reference materials and/or with the candidate material. In particular, some or all of the texture attributes in the first set may be determined based on calculated texture attributes, in particular, in the form of image data, associated with the candidate material or based on measured texture attributes, in particular, in the form of image data, associated with a trial object that comprises the candidate material. Accordingly, the method may comprise determining texture attributes, in particular, in the form of image data, in the first set of appearance attributes based on texture attributes, in particular, in the form of image data, associated with one or more reference materials and/or with the candidate material. This may involve modifying pixel values of image data associated with the reference materials and/or with the candidate material. In this manner the target material can be visualized with a realistic impression of texture even if the measured texture information alone would be insufficient for this purpose.

In still other embodiments, the available appearance attributes of the candidate material or of the reference materials may lack texture attributes or may contain only a limited set of texture attributes. This situation may occur, for instance, if a database containing appearance attributes of reference materials was created using a simpler or older appearance capture device that lacks imaging capabilities or has only limited imaging capabilities. In this case, the appearance attributes in the second set (i.e., the set associated with the candidate material) may be complemented by texture attributes, in particular, in the form of image data, from a different source. In particular, the second set of appearance attributes may comprise texture attributes, in particular, in the form of image data, that have been determined based on measured texture attributes, in particular, in the form of image data, associated with the target material and/or with a trial object that comprises the candidate material. In particular, some or all of the texture attributes in the second set may be determined based on measured texture attributes, in particular, in the form of image data, associated with the target material or on measured texture attributes, in particular, in the form of image data, associated with a trial object that comprises the candidate material. Accordingly, the method may comprise determining texture attributes in the second set of appearance attributes based on measured texture attributes associated with the target material and/or based on texture attributes associated with a trial object that comprises the candidate material. This may involve modifying pixel values of image data associated with the target material and/or with the trial object. In this manner the candidate material can be visualized with a realistic impression of texture even if the available texture information alone would be insufficient for this purpose.

In preferred embodiments, the method comprises:
generating a first instance of an appearance model, the first instance of the appearance model comprising the first set of appearance attributes; and
generating a second instance of the appearance model, the second instance of the appearance model comprising the second set of appearance attributes,
wherein the appearance model comprises a discrete texture table comprising a plurality of destination textures, each destination texture being represented by image data and being associated with a different set of destination coordinates, the set of destination coordinates being indicative of a particular combination of illumination and viewing directions, and
wherein the first and second instances of the appearance model are used for visualizing the at least one virtual object.

While simple embodiments of appearance models describe only the dependence of color on the illumination and viewing conditions, without considering spatial variations of appearance across a surface of an object, in the present context, the appearance model is preferably a model that includes texture, in addition to the angular dependence of reflectance and/or transmission. In particular, the appearance model may be a Spatially Varying Bidirectional Reflectance Distribution Function ("SVBRDF") model, a Bidirectional Texture Function ("BTF") model, a Bidirectional Surface Scattering Distribution Function ("BSSRDF model"), a specialized model for car paints etc. Many such models are known in the art.

Advantageously, the appearance model describes texture in terms of a discrete texture table. The texture table comprises a plurality of textures, each of these textures being represented by image data and being associated with a different set of coordinates, the set of coordinates being indicative of a particular combination of illumination and viewing directions.

The appearance model may generally require many more appearance attributes than the limited set of measured or predetermined appearance attributes that is actually available for the target material, the candidate material, the reference materials or the trial material, respectively. Furthermore, the appearance model may require different types of appearance attributes than those available. In particular, the set of appearance attributes required by the appearance model may have greater cardinality (i.e., contain a larger number of appearance attributes) than the limited set of available appearance attributes. In other words, the set of available appearance attributes may be sparse in comparison to the denser set of appearance attributes required by the appearance model. Mathematical operations, which may involve transformations, fitting operations and/or inter- and extrapolations, may be necessary to generate an instance of the appearance model from the limited set of available appearance attributes. For instance, the limited set of available appearance attributes may contain color attributes, e.g., in the form of trichromatic or spectral data, for only a limited number of pairs of illumination and viewing directions. The limited set of available appearance attributes may further comprise texture attributes, e.g. in the form of image data, for only one pair or a limited number of pairs of illumination and viewing directions. In contrast, the appearance model may describe reflectance and/or transmission as a function of angles and position in a different form. In particular, the appearance model may require spectral data and/or texture data for a much larger number of pairs of illumination and viewing directions than those that are available, and the required illumination and viewing directions may be different from those that are available. Examples how an instance of an appearance model having a dense set of appearance attributes may be generated from a sparse set of available appearance attributes will be described in more detail below.

Generating the first and/or second instances of the appearance model may comprise at least one of the following operations:
interpolating between available appearance attributes at different combinations of illumination and viewing directions; and
extrapolating from available appearance attributes at selected combinations of illumination and viewing directions.

The available appearance attributes may comprise a plurality of source textures, each source texture being associated with a different set of source coordinates, each set of source coordinates being indicative of a combination of illumination and viewing directions for which the corresponding source texture indicates spatial variations of appearance. The source textures may be associated with different sets of source coordinates than the destination coordinates of the discrete texture table. Generating the first and/or second instance of the appearance model may then comprise determining at least one of the destination textures by carrying out a statistical texture synthesis operation based on:
(i) the set of destination coordinates associated with the destination texture;
(ii) the source textures, and
(iii) the sets of source coordinates.

Each set of source and destination coordinates is indicative of a particular combination of illumination and viewing directions. Each set of source and destination coordinates may in particular be a set of two or more angular coordinates. The source and destination coordinates do not need to directly indicate illumination and viewing directions in a reference frame determined by a surface of a material. Instead they may be derived from these directions by a suitable transformation. In particular, the source coordinates and/or destination coordinates may be expressed in a Rusinkiewicz parameterization [Rus98]. In particular, each set of source or destination coordinates may comprise or consist of the polar angles in the Rusinkiewicz parameterization.

Each source texture and each destination texture may be represented by two-dimensional image data, which will generally be in the form of an array of pixels, each pixel having a pixel value representative of reflectance at the location of the pixel. The sizes of the source and destination textures do not need to be identical. Each of the source textures may be representative of spatial variation of the reflectance properties of a material for a particular combination of illumination and viewing directions. Accordingly, the destination texture may be representative of spatial variations of the reflectance properties of the material for another combination of illumination and viewing directions. The spatial variations may be representative, e.g., of the effects of an effect pigment in the material, the effect pigment creating a sparkle effect.

By carrying out a statistical texture synthesis operation, a destination texture is created that has similar statistical properties as the source textures while being dissimilar, on a pixel-by-pixel basis, to any of the source textures and to destination textures at different destination coordinates. This mimics the properties of a metallic effect paint.

The statistical texture synthesis operation may comprise:
(i) assigning an interpolation weight to each of the source textures, based on the destination coordinates and the source coordinates; and
(ii) synthesizing a destination texture using the source textures and the assigned interpolation weights.

In some embodiments, assigning an interpolation weight to each of the source textures comprises the following procedure:
  creating a Delaunay triangulation of the sets of source coordinates;
  finding a simplex in the Delaunay triangulation that contains the destination coordinates, the found simplex having a plurality of corners; and
  using, as the interpolation weights for the source textures at the corners of the found simplex, barycentric coordinates of the destination coordinates with respect to the found simplex.

The interpolation weights for the source textures outside the found simplex are preferably set to zero, i.e., source textures outside the found simplex are not used for synthesizing the destination texture.

Synthesizing the destination texture may comprise the following steps:
(a) randomly choosing one of the source textures with a probability proportional to its interpolation weight;
(b) randomly extracting a texture patch from the chosen source texture, the texture patch being a portion of the source texture;
(c) modifying the extracted texture patch by modifying pixel values in the extracted texture patch to obtain a modified texture patch, modification of the pixel values being carried out in such a manner that at least one statistical property of the modified texture patch approximates a corresponding averaged statistical property, the averaged statistical property being determined by carrying out a weighted average over the source textures, weighted by the interpolation weights;
(d) inserting the modified texture patch into the destination texture so that the modified texture patch seamlessly fits to texture content that is already present in the destination texture; and
(e) repeating steps (a)-(d) until the destination texture is completely filled.

Each texture patch is to be understood to be a continuous part of the source texture from which it has been extracted, i.e., a continuous image patch that has been cut out from the source texture. Each texture patch may have arbitrary shape. Rectangular shape, in particular, quadratic shape, is preferred. Each texture patch preferably has an edge length that corresponds to at least twice the size of the largest effect pigment (e.g., the largest reflective flakes) in the paint that is being modeled. On the other hand, preferably each texture patch has an area that is not larger than 10% of the area of the respective source texture.

The texture patches are extracted randomly, i.e., the position of each extracted texture patch in the chosen source texture is determined randomly, preferably with constant weight over the area of the source texture. By randomly extracting texture patches it is ensured that the resulting destination textures at different destination coordinates are dissimilar.

In preferred embodiments, the statistical property for which an approximate match is desired is a pixel value histogram. A pixel value histogram is a dataset that comprises, for each of a plurality of ranges of brightness values that may be present in an image, an indicator of the relative frequency of that range in the image. Pixel value histograms are widely used in digital image processing for visualizing properties like contrast and brightness of digital images. Their generation from the image data and their interpretation is well known in the art.

The modification of the pixel values preferably comprises applying a point-wise transformation to the pixel values, i.e., a transformation that is applied on each pixel value individually, the point-wise transformation being monotonically non-decreasing. In this manner it is ensured that pixel values that were identical before modification are still identical after modification, and that relative brightness orders of pixels do not change, i.e., a pixel value that was brighter than another pixel value before modification of the texture patch will not be darker than the other pixel value after the modification. Suitable transformation functions are well known in the art of digital image processing. In particular, histogram matching algorithms for determining a transformation function that will cause the histogram of an image to match the histogram of another image are well known in the art.

Inserting the modified texture patch into the destination texture so that it seamlessly fits to the texture content that is already present in the destination texture can be achieved by using techniques like Graphcut/MinCut [Kw03] that are well known in the art. In these techniques, a seam that enforces visual smoothness between the existing texture content and the newly placed patch is computed. The texture patch and the texture content that is already present are stitched together along this seam.

The appearance model may comprise, in addition to the discrete texture table, a monochromatic brightness BRDF model for describing angular dependence of overall reflection properties, averaged over surface positions and wavelengths. Generating an instance of the appearance model of the material may then comprise determining the parameters of the monochromatic brightness BRDF model.

The appearance model may further comprise a discrete color table having a plurality of entries in the form of color values, each entry being associated with a particular set of coordinates, each set of coordinates being indicative of illumination and viewing directions under which the material is viewed. The color values can be expressed in an arbitrary color space, e.g. a trichromatic color space like RGB or CIEXYZ, or any other color space like CIELAB (L*a*b*), or in the form of spectral data representative of a spectral response of a material to incident light, in arbitrary format. Generating an instance of the appearance model may then comprise at least one of the following operations:

(i) determining entries of the discrete color table by interpolating between available color attributes at different combinations of illumination and viewing directions; and/or
(ii) determining entries of the discrete color table by extrapolating from available color attributes at different combinations of illumination and viewing directions.

Instead of a monochromatic BRDF model in combination with a color table, in alternative embodiments, the appearance model may comprise any other kind of model for describing angular dependence of brightness and color. For instance, the appearance model may comprise a trichromatic BRDF model which individually models angular dependence of reflection properties for each of three different color channels in a trichromatic color space like CIEXYZ or RGB, or which models angular dependence of L*a*b* values in the CIELAB color space.

The appearance model may further include a model of the effects of a clear coat layer on top of an opaque of translucent paint layer.

In some embodiments, the scene is visualized with defined illumination conditions, which may be described, e.g., by an environment map, as it is well known in the art. The method may comprise changing the illumination conditions, in particular, one or more illumination directions and/or the type of illuminant, i.e., the spectral properties of the light used for illumination, and visualizing the virtual object with the changed illumination conditions to facilitate comparison of the appearances of the first and second materials under different illumination conditions. For instance, metamerism may in this manner be detected already before a trial object is produced.

In some embodiments, the at least one virtual object is visualized in a defined orientation, and the method comprises changing the orientation of the virtual object, i.e., rotating the virtual object, and visualizing the virtual object in the orientation that is assumes after the change in orientation. Thereby differences in appearance that subtly depend on the directions of illumination and viewing can be better discerned. Visualization can be carried out in the form of a video that visualizes the virtual object being continuously rotated. The method may further comprise changing the size and/or shape of the virtual object.

In some embodiments, the method comprises:
visualizing the at least one virtual object together with a virtual separating element,
wherein the at least one virtual object has first and second portions that are adjacent to each other, the first and second portions being visually separated by the virtual separating element in such a manner that the first and second portions appear to meet where the virtual separating element is located,
wherein the first portion of the at least one virtual object is visualized using the first instance of the appearance model, and
wherein the second portion of the at least one virtual object is visualized using the second instance of the appearance model.

The method may comprise moving the virtual separating element relative to the virtual object. This can be done interactively, i.e., in response to user input, e.g., in response to a user moving a pointing device like a mouse or trackpad, in response to a user hitting a key on a keyboard, or in response to a user sweeping a finger or a pointing device like a digital pencil across a touch screen. When the virtual separating element is moved, the first and second portions are permanently redefined in such a manner that the first and second portions still appear to meet where the virtual separating element is located when the virtual separating element is moved. In this manner the user may visually assess how the appearance of the virtual object changes in a selected region of the virtual object when the material of the virtual object changes.

In some embodiments, the first and second materials may be essentially opaque materials, e.g., coatings as they are used in the automobile industry for coating vehicle parts, or opaque plastics. In other embodiments, the first and second materials may be translucent materials, e.g. translucent plastics. The appearance model may be specifically adapted to a particular class of materials. For instance, for vehicle coatings, the appearance model may include a model of the effects of a clear coating layer on top of an opaque or translucent paint layer and/or a model of the effects of reflecting flakes in the paint layer. As another example, for translucent materials, the appearance model may model subsurface light transport of the material, using volumetric absorption and scattering coefficients and phase function parameters to solve the radiative transfer equation.

The display device may be a screen, e.g., an LCD screen, a projector or any other type of display device as they are well known in the art. If the display device comprises a screen, the screen may be touch-sensitive, as it is well known in the art. The display device may be capable of creating a 3D impression, as it is well known in the art. For instance, the display device may be a VR headset or a 3D display. In such cases the virtual separating element may be a virtual plane. However, in preferred embodiments, the display device displays the visualization of the virtual object as a two-dimensional projection in a two-dimensional viewing plane. In this case, the virtual separating element may be a simple line in the viewing plane, in particular, a straight line.

The present disclosure further provides a system for visualizing the appearances of at least two materials. The system comprises a display device, at least one processor and at least one memory, the memory comprising program instructions configured to cause the processor to carry out the above-described method, using the display device. The system may further comprise the above-mentioned first and/or second appearance capture devices and may accordingly be configured for receiving appearance attributes from these appearance capture devices.

The present disclosure further provides a computer program product comprising program instructions which, when executed by a processor, cause the processor to carry out the above method. The computer program product may comprise a non-volatile computer-readable medium on which the program instructions are stored. The non-volatile medium may include a hard disk, a solid-state drive, a memory card or any other type of computer-readable medium as it is well known in the art.

In particular, the program instructions may comprise rendering software configured to carry out the steps of:
receiving the first and second sets of appearance attributes;
receiving three-dimensional geometry data representing the continuous three-dimensional surface geometry of the at least one virtual object; and
rendering the scene comprising the at least one virtual object based on the first and second sets of appearance attributes and the three-dimensional geometry data.

The rendering software may be configured to receive the first and second sets of appearance attributes in the form of first and second instances of an appearance model.

The program instructions may further comprise model generation software configured to carry out the steps of:
receiving available appearance attributes; and
determining an instance of the appearance model, based on available appearance attributes, using at least one of the following operations:
interpolating between available appearance attributes at different combinations of illumination and viewing directions; and
extrapolating from available appearance attributes at selected combinations of illumination and viewing directions.

The program instructions may further comprise formulation software configured to calculate appearance attributes associated with a candidate material, using predetermined appearance attributes associated with a plurality of reference materials, and using a recipe. The formulation software may further be configured to determine the recipe in such a manner that the candidate material has expected appearance attributes that at least approximately match appearance attributes of a target material.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Definitions

Figure 1:
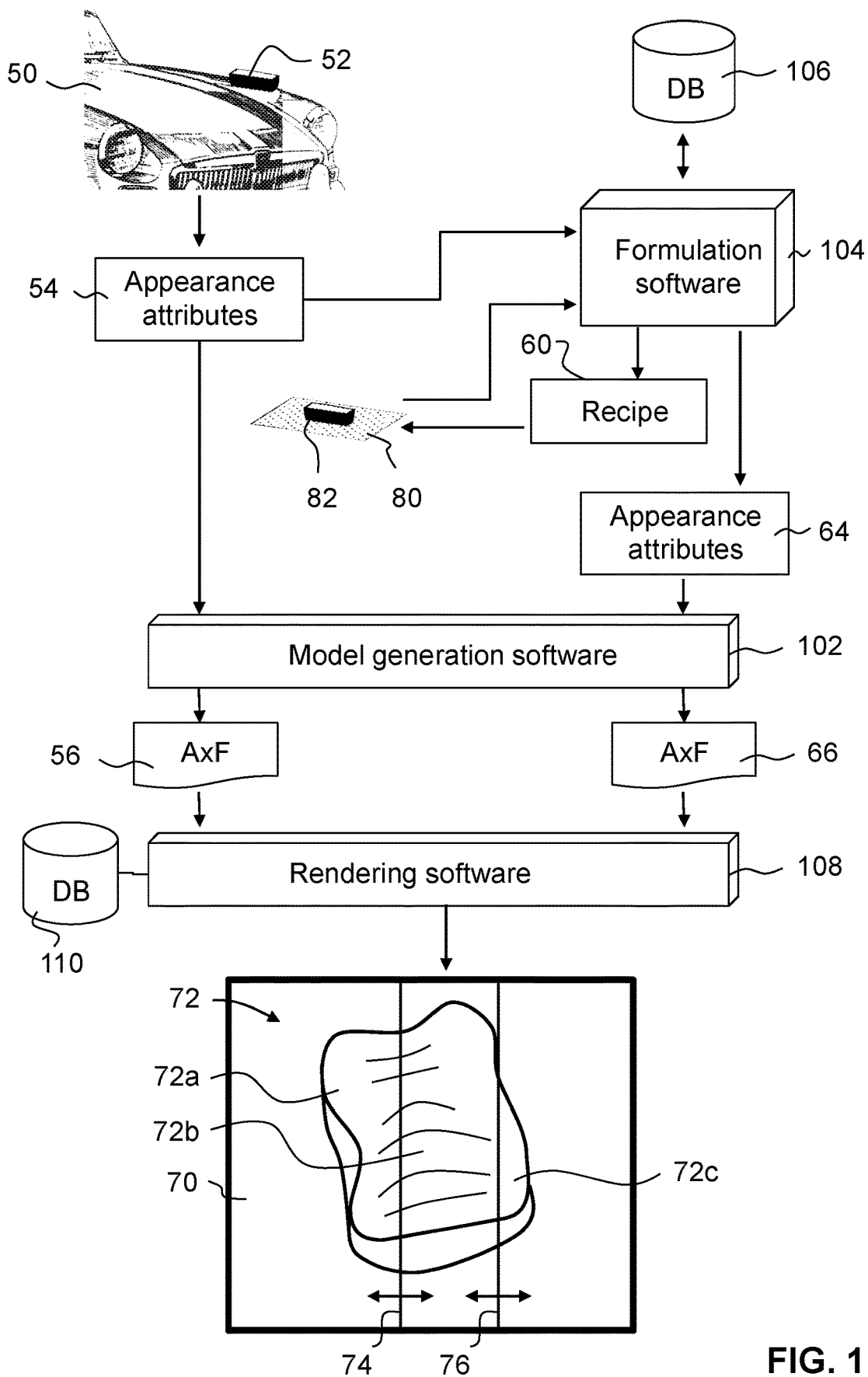
FIG. 1 shows a schematic illustration of a method of visualizing the appearances of two materials.

In the present disclosure, references in the singular may also include the plural. Specifically, the word "a" or "an" may refer to one, or one or more, unless the context indicates otherwise.

The term "colorant" is to be understood as a constituent of a material that provides the appearance of color when light it reflected from it or transmitted through it. Colorants include pigments and dyes. A "pigment" is a colorant that is usually insoluble in a base constituent material. A pigment can be from natural or synthetic sources. A pigment can comprise organic and inorganic constituents. The term "pigment" also encompasses so-called "effect pigments", which produce special effects in a material. Examples include interference pigments and reflective particles or flakes. A "dye" is a colorant that is usually soluble in a base constituent material.

The term "recipe" is to be understood as relating to a collection of information that determines how a material is to be prepared. The material may comprise a coating material, such as automotive paint, a solid material, such as plastic materials, a semi-solid material, such as gels, and combinations thereof. The recipe includes, in particular, the concentrations of the constituents of which the material is composed, such as a base and colorants. A material that has been prepared according to a recipe may also be called a "formulation".

The term "visual appearance" or briefly "appearance" is to be understood broadly as the way in which an object reflects and transmits light, including but not limited to, how individuals viewing the object perceive color and surface texture of the object in various viewing conditions. Appearance also includes instrumented measurements of how an object reflects and transmits light.

One aspect of visual appearance is color. The "color" of an object is determined by the parts of the spectrum of incident white light that are reflected or transmitted without being absorbed. The color of an object can be described by "color attributes". In general terms, color attributes are indicative of the spectral response of the object when it is illuminated by incident light. In the context of the present disclosure, the term "color attribute" is to be understood broadly as encompassing any form of data that is indicative of the spectral response of an object when it is illuminated by incident light. Color attributes can take the form of color values in an arbitrary color space, e.g. in a trichromatic color space like RGB or CIEXYZ, or in any other color space like CIELAB (L*a*b*), or in the form of spectral data representative of a spectral response of a material to incident light, in arbitrary format. In the context of the present disclosure, color attributes may in particular include reflectance values and/or absorption and scattering coefficients of a material at a plurality of wavelengths. A "discrete color table" is to be understood as relating to a collection of sets of color attributes, each set of color attributes associated with a different combination of illumination and viewing directions.

Another aspect of visual appearance is texture. The term "texture" is to be broadly understood as referring to the spatial variation of appearance across the surface of the material, both on a microscopic or mesoscopic scale (i.e., on a scale on which individual structure elements can normally not be discerned by the naked eye) and on a macroscopic scale (i.e., on a scale on which individual structure elements can be discerned by the naked eye). Texture as understood in the present disclosure includes phenomena like coarseness, sparkle, and macroscopic variations of surface topography. Texture can be described by "texture attributes". In the context of the present disclosure, the term "texture attributes" is to be understood broadly as encompassing any form of data that is able to quantify at least one aspect of texture. Examples of texture attributes include global texture attributes such as a global coarseness parameter or a global sparkle parameter. In some embodiments, texture attributes can include a normal map or a height map. In some embodiments, texture attributes can include image data. In some embodiments, the image data can be associated with particular combinations of illumination and viewing directions. In such embodiments, the texture attributes can comprise a plurality of sets of image data, each set of image data associated with a different combination of illumination and viewing directions. A "discrete texture table" is to be understood as relating to a collection of sets of texture attributes, preferably in the form of image data, each set of texture attributes associated with a different combination of illumination and viewing directions. In some embodiments of the present disclosure, images in a discrete texture table are generated from a set of source textures, and these images are accordingly called "destination textures".

The term "appearance model" is to be understood as relating to a formal construct that describes appearance in mathematical terms, using a plurality of material-dependent parameters called "appearance attributes". The appearance attributes may include color attributes and texture attributes. The appearance model is preferably device- and platform-independent, i.e., it is independent of a specific measurement device with which the appearance attributes might have been determined, and it is independent of a specific rendering platform for visualization. The appearance model offers a mathematical description of appearance in such a form and at such a level of completeness that it is possible to generate visualizations (i.e., render and display) of a virtual object under arbitrary illumination and viewing conditions, using the appearance model combined with a geometric model of the virtual object. For any portion of the surface of a virtual object whose geometry is defined by the geometric model and for any given illumination and viewing angle, an appearance model provides the necessary information to calculate appropriate appearance attributes.

A "virtual object" is an object that exists only virtually in a computer. A virtual object may or may not correspond to a real, tangible object. A virtual object may be defined mathematically by a geometric model and by associated appearance information.

A "geometric model" of a real or virtual object is to be understood as an at least approximate representation of the geometry of any surface of the object in three dimensions. For instance, in some embodiments, a geometric model defines curves along at least two mutually orthogonal directions. In other embodiments, a geometric model defines a plurality of polygons or facets. A geometric model may be represented, e.g., by a CAD file.

The expression "instance of an appearance model" is to be understood as relating to a set of values for all appearance attributes of a particular appearance model, supplemented by information that enables identification of the underlying appearance model. In other words, while an appearance model itself is a formal construct that defines how appearance is described in terms of a set of appearance attributes, an instance of an appearance model includes actual values of these appearance attributes particular to a given material, e.g., as determined by measurement and/or as derived from appearance attributes of individual constituents of a material. In particular, an instance of an appearance model may be provided in the form of a data file. Preferably the data file is in a device- and platform-independent format such as the AxF™ format proposed by X-Rite. An AxF file may therefore be considered a representation of an "instance" of an appearance model. However, the present disclosure is not limited to a particular format for the instance of the appearance model, and the instance of the appearance model may be provided in another file format, e.g., the MDL format, or it may even be provided in a different form than a file, e.g., as a data stream.

Brightness attributes may be represented in an appearance model with a bidirectional reflectance distribution function. A "bidirectional reflectance distribution function" (BRDF) is to be understood in the usual sense as a function that defines how light is reflected at an opaque surface dependent on illumination and viewing directions, providing the ratio of reflected radiance exiting along a viewing direction to the irradiance incident on the surface from an illumination direction. If the surface exhibits spatial variations of this ratio, the BRDF is understood as providing an average of the ratio over the surface area. A "monochromatic brightness BRDF" is a BRDF that provides a (possibly weighted) average of the ratio over all visible wavelengths, thus modeling the overall brightness variation of a surface.

"Image data" are data that represent an image. Images include images of actual target surfaces or objects and synthesized images derived from one or more geometric models combined with one or more sets of appearance attributes. An image can take the form of a two-dimensional array of picture elements ("pixels"), each pixel having a pixel value. The pixel value can be representative of reflectance at the location of the pixel at a particular wavelength, averaged over a particular wavelength range, or averaged over all visible wavelengths. Accordingly, in some embodiments, image data can be provided in the form of an array of pixel values. In other embodiments, image data can be provided in compressed form or in a transformed form. A "set of image data" is a data set that comprises or consists of image data for at least one image, i.e., a data set that represents one or more images.

Two images X, Y of equal size are considered "dissimilar" on a pixel-by-pixel basis if their pixel values are uncorrelated. Dissimilarity can be quantified by a suitably defined correlation measure of the pixel values. For the purposes of the present disclosure, the images can be considered "dissimilar" if the absolute value of Pearson's product-moment correlation coefficient $r_{XY}$ for the pixel values in the images is not larger than 0.1, preferably not larger than 0.02. Pearson's product-moment correlation coefficient $r_{XY}$ is defined as the quotient of the covariance of the pixel values divided by the product of the standard deviations (i.e., the square roots of the variances) of the pixel values of both images:

$$r_{XY} = \frac{\sum_{i=1}^{N}(x_i - \bar{x})(y_i - \bar{y})}{\sqrt{\sum_{i=1}^{N}(x_i - \bar{x})^2}\sqrt{\sum_{i=1}^{N}(y_i - \bar{y})^2}}$$

Here, $x_i$ designates a pixel value in image X, $\bar{x}$ designates the arithmetic mean of the pixel values in image X, $y_i$ designates a pixel value in image Y, $\bar{y}$ designates the arithmetic mean of the pixel values in image Y, N indicates the number of pixels in each image (being the same for both images as the images have equal size), and the summation is over all pixels. The arithmetic mean $\bar{x}$ of the pixel values in an image X is defined in the usual manner as $$\bar{x} = \frac{1}{N}\sum_{i=1}^{N} x_i.$$

A "Rusinkiewicz parameterization" is a description of the illumination and viewing directions in terms of a "halfway vector", which is defined as the vector that is halfway between the incoming and reflected rays, and a "difference vector", which is the illumination direction in a frame of reference in which the halfway vector is at the north pole. The spherical coordinates of the halfway vector in a sample-fixed reference frame in which the surface normal is the at the north pole can be designated as $(\theta_h, \phi_h)$, where $\theta_h$ is called the polar "halfway angle". The spherical coordinates of the difference vector in a reference frame in which the halfway vector is at the north pole can be designated as $(\theta_f, \phi_f)$, where $\theta_f$ is called the polar "difference angle". The remaining angles that define illumination and viewing directions are the azimuthal angles $\phi_h$ and $\phi_f$. For details, reference is made to [Rus98], whose contents are incorporated herein by reference in their entirety.

In some embodiments of the present disclosure, texture attributes associated with an appearance model are determined using barycentric coordinates. "Barycentric coordinates" are coordinates in a coordinate system in which the location of a point of a simplex (i.e., a triangle in the case of two dimensions) is specified by weights assigned to its vertices. In two dimensions, a simplex is a triangle. Barycentric coordinates in two dimensions of a point r with respect to the vertices $r_1$, $r_2$, and $r_3$ are given by three numbers $\lambda_1$, $\lambda_2$, $\lambda_3$, such that $$(\lambda_1+\lambda_2+\lambda_3)r=\lambda_1 r_1+\lambda_2 r_2+\lambda_3 r_3,$$

where at least one of the numbers $\lambda_1$, $\lambda_2$, $\lambda_3$ is non-zero. The barycentric coordinates may be required to be non-negative (i.e., the point may be required to be located inside the convex hull of the vertices). The barycentric coordinates may be required to fulfill the condition $\lambda_1+\lambda_2+\lambda_3=1$. They are then called "absolute barycentric coordinates".

An "appearance capture device" is a device that is able to determine one or more appearance attributes of an object. Depending on the appearance attributes to be determined, an appearance capture device can take the form of, e.g., a camera, a colorimeter, a spectrophotometer, or an imaging spectrophotometer.

A "spectrophotometer" is a device for determining the reflection and/or transmission properties of a surface or material as a function of wavelength, i.e., the spectral response of an object, under illumination with visible light. Different types of spectrophotometers are known, having different measurement geometries and being optimized for different purposes. One important type is the "integrating sphere spectrophotometer". An integrating sphere spectrophotometer comprises an "integrating sphere", i.e., a hollow spherical cavity delimited by a diffusely reflective white inner surface, having at least one entrance port for illumination and at least one exit port for observation. The integrating sphere causes a uniform scattering or diffusing effect. Light rays incident on any point on the inner surface are, by multiple scattering reflections, distributed equally to all other points. The effects of the original direction of light are minimized. Examples of integrating sphere spectrophotometers are the models Ci7860 and Ci7500 of X-Rite. Other types of spectrophotometers determine spectral information for only a single narrow range of directions of illumination, e.g., at 45° to the surface normal, and a single narrow range of directions of observation, e.g., at 0° to the surface normal. Examples include the models 962 and 964 available from X-Rite. Yet other spectrophotometers, called "goniospectrophotometers" or "multi-angle spectrophotometers", are capable of determining spectral information for a plurality of combinations of different illumination and observation directions. A "measurement geometry" means a particular combination of an illumination angle and an observation angle. An "imaging spectrophotometer" additionally has imaging capabilities, i.e., it can comprise one or more cameras to take one or more digital images of an object. Examples of multi-angle spectrophotometers with imaging capabilities include the benchtop model TAC7 or the handheld models MA-T6 or MA-T12 available from X-Rite.

A material may be transparent, translucent or opaque. A material is "transparent" if it allows light to pass through the material without appreciable absorption and scattering of light. A material is "translucent" if it allows light to pass through, but light may be scattered at either of the two interfaces or internally. A material is "opaque" if it does not transmit light. A material may be opaque only in some spectral regions while it is translucent or transparent in other spectral regions, and vice versa. For instance, a material may strongly absorb red light, being essentially opaque to red light, while only weakly absorbing blue light, being transparent for blue light. Some more complex materials, especially gonioapparent materials, may comprise a combination of transparent, translucent, and opaque materials. For example, a paint coating may include an opaque base layer and a transparent clear coat. Opaque (reflective or interference flakes) or translucent pigments may be included in opaque, transparent, or translucent layers of a paint coating.

For the purposes of the present disclosure, a material will broadly be considered "translucent" if a reasonably thin slice of the material transmits an appreciable fraction of incident radiant flux in at least one portion of the visible spectrum, e.g., if a slice having a thickness of 0.1 mm transmits at least 1% of the incident radiant flux in at least one portion of the visible spectrum. In this sense, the term "translucent" encompasses the term "transparent", i.e., for the purposes of the present disclosure, a transparent material is to be considered to be translucent as well. Examples of translucent materials in this sense include many common plastics materials on the basis of polymers, including but not limited to organic polymers like PET, PP, PE, PMMA, PS, PC, PVC, PTFE, Nylon, organic copolymers like styrene-butadiene copolymer, inorganic polymers like polysiloxane, and many natural polymers. A translucent plastics material can comprise pigments and additives. However, also other classes of materials can be translucent in the sense of the present disclosure, including, e.g., silicate glass or paper.

For the purposes of the present disclosure, a material is to be understood as "homogeneous" if its subsurface light transport properties do not vary on a macroscopic or mesoscopic scale, e.g., on a scale of more than 1 µm. In particular, a homogeneous material does not comprise mesoscopic or macroscopic gonioapparent objects like flakes.

The term "macroscopic surface geometry" is to be understood as relating to the overall geometry of a product, excluding microscopic or mesoscopic surface structure, i.e., excluding variations of the surface geometry on a microscopic or mesoscopic scale below, e.g., 1 mm. For instance, local variations of surface height of less than, e.g., 1 mm from a local average may be considered microscopic or mesoscopic surface structure, and accordingly the macroscopic surface geometry may be equated with the surface geometry after averaging over a length scale of at least 1 mm. A surface geometry is "continuously curved" if, in mathematical terms, it corresponds at least approximately and at least locally to a two-dimensional differentiable manifold in three-dimensional Euclidean space.

The term "rendering" refers to the automatic process of generating a photorealistic image of a scene by means of a computer program. In the present disclosure, the scene comprises at least one virtual object. Input information for a rendering operation includes a 3D geometric model of the at least one virtual object, at least one set of appearance attributes associated with the virtual object, information about the position and orientation of the at least one virtual object in the scene, the lighting conditions (which may take the form of an environment map), and parameters that characterize the observer such as the viewpoint, focal length, field of view, depth of field, aspect ratio, and/or spectral sensitivity. The output of a rendering operation is an image of the scene, which includes an image of at least a portion of the virtual object. Many different rendering algorithms are known at different levels of sophistication, and software used for rendering may employ a number of different techniques to obtain a final image. Tracing every particle of light in a scene is often impractical, as it requires excessive computing time. Therefore, simplified techniques for modelling light transport are commonly used, such as ray tracing and path tracing . . .

The term "visualizing" encompasses rendering a scene comprising a virtual object and displaying the rendered scene. For displaying, a display device is used. The term "display device" or briefly "display" is to be understood as relating to an output device of a computer for presentation of information in visual form. A display device may take the form of a computer monitor, a TV screen, a projector, a VR headset, a screen of a handheld device such as a smartphone or tablet computer etc. The display device can be a touchscreen. In some embodiments, a display device can be a "virtual light booth" as disclosed in EP 3 163 358 A1 so as to provide a particularly realistic impression of a rendered scene.

The term "database" refers to an organized collection of data that can be accessed electronically by a computer system. In simple embodiments, the database can be a searchable electronic file in an arbitrary format. Examples include a Microsoft Excel™ spreadsheet or a searchable PDF document. In more sophisticated embodiments, a database can be a relational database that is maintained by a relational database management system using a language like SQL.

The term "computer" or "computing device" refers to any device that can be instructed to carry out sequences of arithmetic or logical operations automatically via a program. Without limitation, a computer can take the form of a desktop computer, a notebook computer, a tablet computer, a smartphone, a programmable digital signal processor etc. A computer generally includes at least one processor and at least one memory device. A computer may be a subunit of another device, such as an appearance capture device. A computer may configured to establish a wired or wireless connection to another computer, including a computer for querying a database. A computer can be configured to be coupled to a data input device like a keyboard or a computer mouse or to a data output device like a display or a printer via a wired or wireless connection.

A "computer system" is to be broadly understood as encompassing one or more computers. If the computer system comprises more than one computer, these computers do not necessarily need to be at the same location. The computers within a computer system may communicate with one another via wired or wireless connections.

A "processor" is an electronic circuit which performs operations on an external data source, in particular, a memory device.

A "memory device" or briefly "memory" is a device that is used to store information for use by the processor. The memory device may include volatile memory, as for random-access memory (RAM), and nonvolatile memory, as for read-only memory (ROM). In some embodiments, the memory device may include a non-volatile semiconductor memory device such as an (E)EPROM or a flash memory device, which may take the form of, e.g., a memory card or a solid-state disk. In some embodiments, the memory device may include a mass storage device having mechanical components, like a hard disk. The memory device can store a program for execution by the processor. A non-volatile memory device may also be called a non-volatile computer-readable medium.

A "program" is a collection of instructions that can be executed by processor to perform a specific task.

A "wired connection" is a connection via an electrical conductor. A wired connection can include one or more cables. A "wireless connection" is a connection that includes the electromagnetic transfer of information between two or more points that are not connected by an electrical conductor. Wireless connections include connections via WiFi™ Bluetooth™, 3G/4G/5G mobile networks, optical communications, infrared, etc.

Exemplary Embodiment of Method Using Color Formulation Software

FIG. 1 illustrates an exemplary embodiment of a method of visualizing the appearances of two or more materials in the context of vehicle repair.

Suppose that a damaged vehicle needs to be repaired in a body shop. A technician at the body shop uses a hand-held appearance capture device 52 to determine a set of appearance attributes 54 of a paint coating on an intact vehicle part. The paint coating is an example of a target material, and the intact vehicle part is an example of a target object that comprises the target material. The appearance attributes 54 of the paint coating comprise, on the one hand, color attributes in the form of spectral data for a plurality of pairs of illumination and viewing directions and, on the other hand, texture attributes in the form of image data for a plurality of (possibly different) pairs of illumination and viewing directions.

The appearance capture device 52 transmits the measured appearance attributes 54 to a computer system. The computer system may comprise a local client computer at the premises of the body shop. The computer system may further comprise one or more remote computers at one or more different locations than the body shop. The local client computer may be, e.g., a mobile electronic device, such as a notebook computer or tablet computer. The remote computers may act as servers for the local client computer at the body shop.

The computer system executes several elements of software. In a first aspect, the computer system executes model generation software 102. The model generation software 102 generates a first instance 56 of a selected formal appearance model, based on the measured appearance attributes 54, the first instance 56 representing the appearance of the target material. The first instance of the appearance model is stored in a first AxF file in a device- and platform-independent form.

In a second aspect, the computer system executes color formulation software 104. The color formulation software 104 determines one or more candidate recipes 60 from a database of reference recipes. Each candidate recipe defines a candidate material (in the present example, a candidate paint coating) whose appearance attributes are likely to match the measured appearance attributes 54 of the target material, the candidate material comprising one or more colorants in a base formulation. For determining the candidate recipes, the formulation software 104 retrieves predetermined appearance attributes associated with different reference materials from a database 106. In particular, the predetermined appearance attributes may be associated with individual colorants and/or with reference recipes comprising one or more colorants dispersed in a base formulation. In particular, the database 106 may comprise two sub-databases: a colorant database that stores appearance attributes associated with individual colorants and base materials, and a recipe database that stores appearance attributes associated with reference recipes. The appearance attributes in database 106 may have been determined beforehand by carrying out measurements on reference objects comprising reference materials made according to the reference recipes or comprising the constituents of the reference recipes.

For instance, for determining the appearance attributes associated with individual colorants in the colorant database, drawdowns coated with formulations comprising a single colorant at different concentrations may be prepared and measured; for determining the appearance attributes in the recipe database, drawdowns coated with formulations that have been prepared according to the reference recipes may be measured. The measurements may be carried out using an appearance capture device which may be of the same type as the appearance capture device 52, or which may be of a different type, as will be discussed in more detail below.

The formulation software uses the predetermined appearance attributes retrieved from database 106 to compute candidate recipes whose associated appearance attributes are expected to be "close" to the measured appearance attributes of the target material. The appearance attributes of a candidate recipe are "close" to the measured appearance attributes of the target material if an appearance difference between the appearance attributes of the candidate recipe and the measured appearance attributes are small according to some predefined difference norm. In other words, the formulation software carries out a minimization algorithm for determining candidate recipes that are near a minimum of the difference norm. The formulation software 104 outputs one or more of the thus-determined candidate recipes 60. The technician selects and optionally manually modifies one of the candidate recipes. The formulation software 104 provides a set of candidate appearance attributes 64 for the selected (and optionally modified) candidate recipe 60. In some use cases, the candidate recipe corresponds to a single reference material, i.e., the candidate appearance attributes comprise appearance attributes associated with a single reference material. In other use cases, the candidate appearance attributes are calculated from measured appearance attributes associated with multiple reference materials. The reference materials may comprise individual constituents of the candidate recipe in a manner that enables a determination of appearance attributes associated with these individual constituents. This is particularly useful when a candidate recipe is modified by altering the proportions of individual constituents of the recipe. The model generation software 102 receives the candidate appearance attributes 64 and generates a second instance 66 of the appearance model, representing the expected appearance of a paint coating that has been prepared according to the candidate recipe 60. The second instance 66 of the appearance model is stored in a second AxF file.

In a third aspect, the computer system executes rendering software 108. The rendering software renders a virtual object 72, i.e., it creates a photorealistic digital image of the virtual object 72 based on a geometric model of the surface geometric of the virtual object 72, at least one instance of an appearance model, and illumination and viewing conditions. The rendered virtual object 72 is displayed in a scene on a display 70. The geometric model defines a continuous three-dimensional macroscopic surface geometry having surface normals that are distributed over a comparatively large solid angle, i.e., it comprises curved or rectilinear surface portions that have directions perpendicular to the surface portions pointing into many different directions. In 3D computer graphics, it is well known to use a polygonal modeling as an approach for modeling objects by representing or approximating their surfaces using polygon meshes. These are also considered to be a continuously curved three-dimensional macroscopic surface if the polygon meshes essentially appear as a continuously curved surface when rendered. The rendering software generates a two-dimensional image of the virtual object 72 in a particular orientation and under particular illumination conditions, assuming particular viewing conditions. Surface geometry, orientation and illumination conditions are chosen in such a manner that the rendered image gives a good impression of the appearance of the virtual object for a large range of angles between the surface normal, the illumination direction and the viewing direction, respectively, so as to allow an observer to assess the appearance of the rendered virtual object 72 for a large range of these directions simultaneously.

The virtual object 72 has first and second portions 72a, 72b that are adjacent to each other. The first portion 72a is rendered using the first instance 56 of the appearance model, while the second portion 72b is rendered using the second instance 66 of the appearance model. A virtual separating line 74 is visualized between the first and second portions 72a, 72b. The first and second portions 72a, 72b appear to meet at the virtual separating line 74.

The display 70 may be located at the body shop. For instance, the display 70 may be a touchscreen display of the local client computer at the body shop. The technician at the body shop can move the virtual line 74 across the display 70 using his finger or using a pointing device like a digital pen, a trackpad or a mouse and observe how appearance matches or differs between the first and second instances of the appearance model as rendered on the virtual object 72, i.e., between the appearance of the actual paint coating of the car as measured and the expected appearance of a paint coating that has been prepared according to the candidate recipe. Optionally, the technician can change the shape of the virtual object, rotate the virtual object in space, simultaneously changing illumination and viewing angles. Optionally, the technician can change the illumination conditions, including illumination directions and choice of illuminants.

In some embodiments, the virtual object 72 may have the shape of an actual part of the damaged car, for instance, the shape of the target object 50. To this end, the rendering software 108 may retrieve a three-dimensional geometric model corresponding to the geometry of the car part from a suitable memory, for instance, from a database 110 that stores geometric data of a plurality of car parts. To this end, the technician can provide, e.g., manufacturer and model of the damaged car or another type of vehicle information, such as a unique Vehicle Identification Number, along with one or more components to be rendered as virtual objects 72.

In other embodiments, the rendered virtual object 72 is a three-dimensional object that is different from an actual car part of a car to be repaired, but has a three-dimensional shape useful for inspecting appearance characteristics of various materials. Also in such embodiments, the rendering software 108 may retrieve a three-dimensional geometric model of the virtual object from a memory, e.g., from the database 110. Regardless of whether or not the virtual object 72 represents an actual car part, the virtual object 72 preferably allows for an inspection of color and texture differences for a large number of angles between the surface normal, the illumination direction and the viewing direction simultaneously.

The appearance of the first portion 72a of the rendered virtual object, when viewed on the display 70, does not need to perfectly match the appearance of the actual target object 50. In particular, the display 70 does not need to be calibrated. What matters is that the appearances of the first and second portions 72a, 72b are directly comparable to each other, both in color and in texture. This is possible even if the colors on the display are not true colors. Direct comparability of the appearances of the two portions 72a, 72b is ensured by using the same appearance model for both portions.

It should further be noted that neither the appearance model itself nor the rendering software need to be perfect in order to ensure direct comparability. It suffices that the appearance model and the rendering software enable a reasonably realistic judgement of differences between the two instances representing the actual coating material on the target object 50 and a coating material according to the candidate recipe 60.

If the visual comparison of the first and second portions 72a, 72b shows that the match is not yet satisfactory, the technician can modify the candidate recipe 60 in the formulation software 104 by selecting a different candidate recipe or by modifying the previously selected candidate recipe. The formulation software 104 provides the appearance attributes of the modified candidate recipe to the model generation software 102, which creates a modified second instance of the appearance model based on these attributes. The rendering software 108 may be instructed to render the second portion of the virtual object using the modified second instance of the appearance model, thereby replacing the previous candidate recipe in the visualization by the modified recipe, or the rendering software may be instructed to split the virtual object into three portions 72a, 72b, 72c so as to visualize the reference material together with both candidate recipes, adding another movable separating line 76 in the visualization ("recursive splitter control").

When a satisfactory match has been obtained, an actual trial object 80, e.g., a drawdown, may be produced with a selected candidate recipe 60. Appearance attributes of the trial object 80 may be determined using an appearance capture device 82. The appearance attributes of the trial object 80 may be compared to those of the target object 50 in order to determine whether the match is objectively within tolerances. This may be done by evaluating a suitable difference norm between the measured appearance attributes of the trial object 80 and those of the target object 50. In addition or in the alternative, a third instance of the appearance model may be generated, using the appearance attributes of the trial object 80, and the target material and the trial material may be visualized side-by-side on the display 70, using the associated instances of the appearance model. Of course, it is also possible to directly compare the physical trial object 80 to the physical target object 50 if both objects are located at the same location. If the match is not yet within tolerances, the formulation software 104 may further modify the candidate recipe 60 by considering the differences between the predicted appearance attributes of the candidate recipe 60 to those that have been actually determined for the trial object 80.

The trial object 80 may be produced by the technician in the body shop. However, most often the trial object 80 will be produced by a paint supplier at a location that is remote from the body shop. Therefore, the appearance capture device 82 for determining the appearance attributes of the trial object 80 may be different from the appearance capture device 52 that was used for determining the appearance attributes of the target object 50.

In the above embodiment it was assumed the technician at the body shop not only operates the appearance capture device 52 to determine the set of appearance attributes 54 of the target object 50, but that the same person also operates the formulation software 104 to define one or more candidate recipes and compares the first and second portions 72a, 72b of the virtual object 72 using the display 70. However, these tasks may as well be divided among different persons working at different locations. For instance, the technician at the body shop may transmit the appearance attributes 54 to a remote paint supplier, and a paint specialist at the paint supplier may define a candidate recipe using the formulation software 104 and may compare the different portions of the virtual object to determine whether the expected match is satisfactory. Accordingly, the computer system may comprise at least one computer under the control of the paint supplier, e.g., a computer executing the formulation software 104, the model generation software 102, and the rendering software 108. Many other possibilities exist for the division of tasks among different entities involved in the process. It will thus be apparent to a skilled person that the computer system may comprise several computers which may be located at different locations and which may be under the control of different entities, these computers communicating via wireless or wired data communication connections.

Other Possible Ways of Visualizing Objects Using the Instances of the Appearance Model In alternative embodiments, the instances of the appearance model may be used to visualize other scenes than a scene that comprises only a single virtual object having two or more portions that are visualized using different instances of the appearance model. For instance, a scene comprising two or more identical or different virtual objects may be visualized, each of the virtual objects being visualized using a different instance of the appearance model. In general terms, the scene comprises one or more virtual objects, and different portions of the scene are visualized using different instances of the appearance model. For instance, two identically shaped objects (e.g., two identically shaped vehicle parts like rearview mirrors) may be visualized side by side using first and second instances of the appearance model combined with a common geometric model.

Flow Diagram

Figure 2:
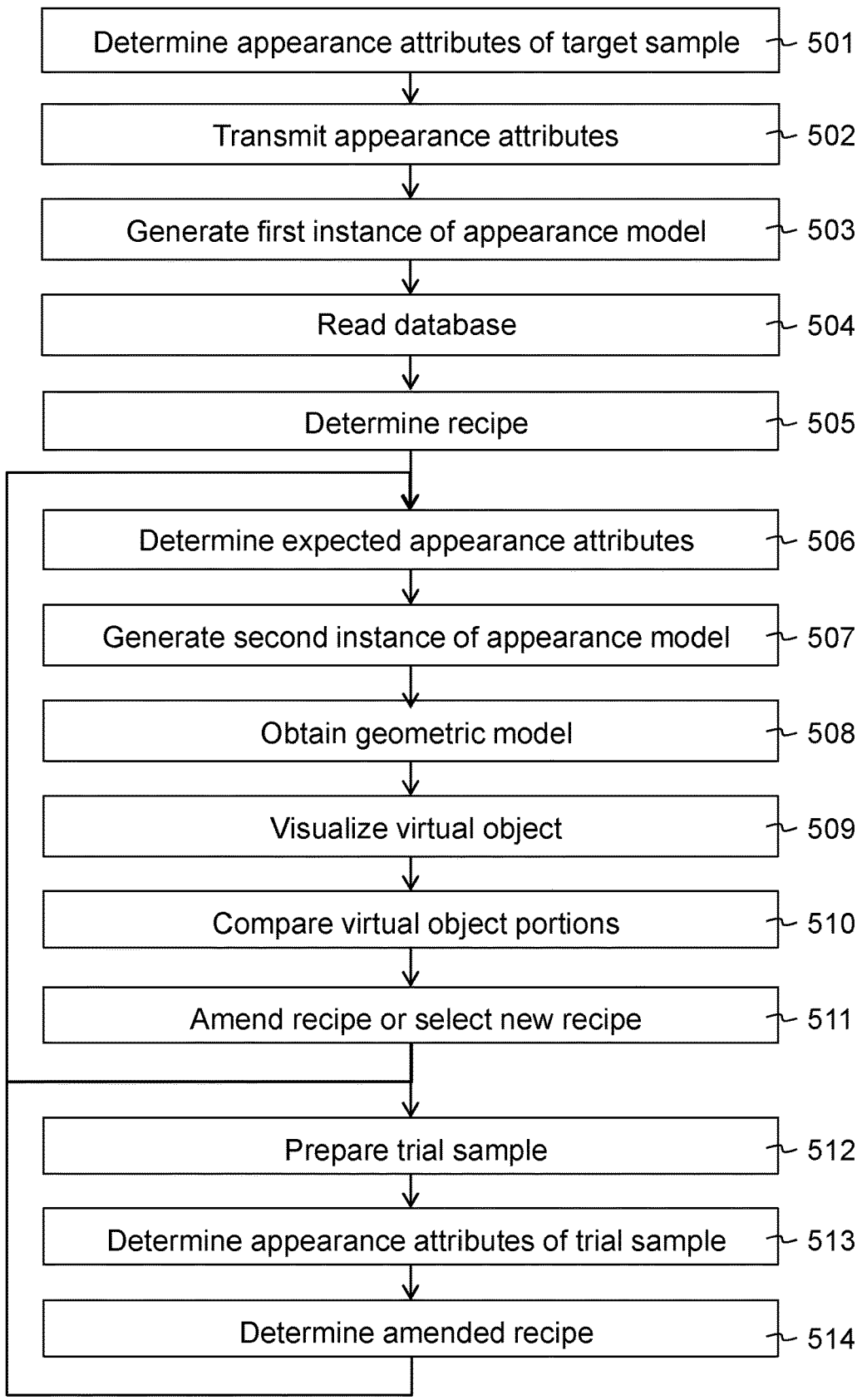
FIG. 2 shows a flow diagram illustrating the method of FIG. 1.

FIG. 2 shows an exemplary flow diagram illustrating the method of visualizing the appearances of two materials. In step 501, a user (e.g., a technician at the body shop) determines appearance attributes 54 of a target object 50 by measuring light reflectance and/or transmission properties, and optionally texture properties, of the target object with a first appearance capture device 52. In step 502, the appearance capture device 52 transmits these measured appearance attributes to a component of a computer system, e.g., to a handheld computer in the body shop. In step 503, the computer system generates a first instance 56 of an appearance model from the measured appearance attributes, using model generation software 102. In step 504, the computer system reads appearance attributes of one or more reference materials from a database 106. In step 505, the computer system determines one or more candidate recipes 60, using formulation software 104. The formulation software 104 may perform this step 505 by simply selecting one or more reference materials having similar appearance attributes as the measured appearance attributes 54 of the target object 50, by modifying a recipe of a retrieved reference material, or by generating a new candidate recipe 60 if a close match is not found in the database 106. In step 506, the computer system determines appearance attributes 64 associated with the candidate recipe 60, using the formulation software 104. In step 507, the computer system generates a second instance 66 of the appearance model from the appearance attributes 64 associated with the candidate recipe 60, using the model generation software 102. In step 508, the computer system obtains a geometric model for a virtual object. In step 510, the computer system visualizes the virtual object 72, using rendering software 108, based on the two instances 56, 66 of the appearance model, a geometric model of the virtual object 72, and illumination and viewing conditions. In step 509, the user compares rendered virtual object portions 72a, 72b, for acceptable appearance match. In step 511, the user may amend the recipe or select a different candidate recipe 60 if the visualized virtual object portions 72a, 72b do not provide an acceptable visualized match. Once an acceptable rendered match is obtained, in step 512, the user prepares the trial object 80 using the candidate recipe. In step 513, the same or a different user determines the appearance attributes of the trial object 80 using the second appearance capture device 82. In step 514, the appearance attributes of the trial object 80 are transmitted to the computer system, and the computer system determines an amended recipe, if necessary to refine the match, using the formulation software 104. Steps 506 to 514 can then be repeated for the amended recipe. In some embodiments, the measured appearance attributes and expected appearance attributes are compared to determine a level of appearance information and appearance attributes are edited as set forth with respect to the discussion of FIGS. 14-16. In some embodiments, the first and second appearance models are compared to determine a level of appearance information and appearance attributes are edited. In some embodiments, the measured appearance attributes are compared with the second instance of the appearance model to determine a level of appearance information and an edited appearance model is obtained as set forth with respect to the discussion of FIGS. 14-16.

Computer System: Exemplary Hardware

Figure 3:
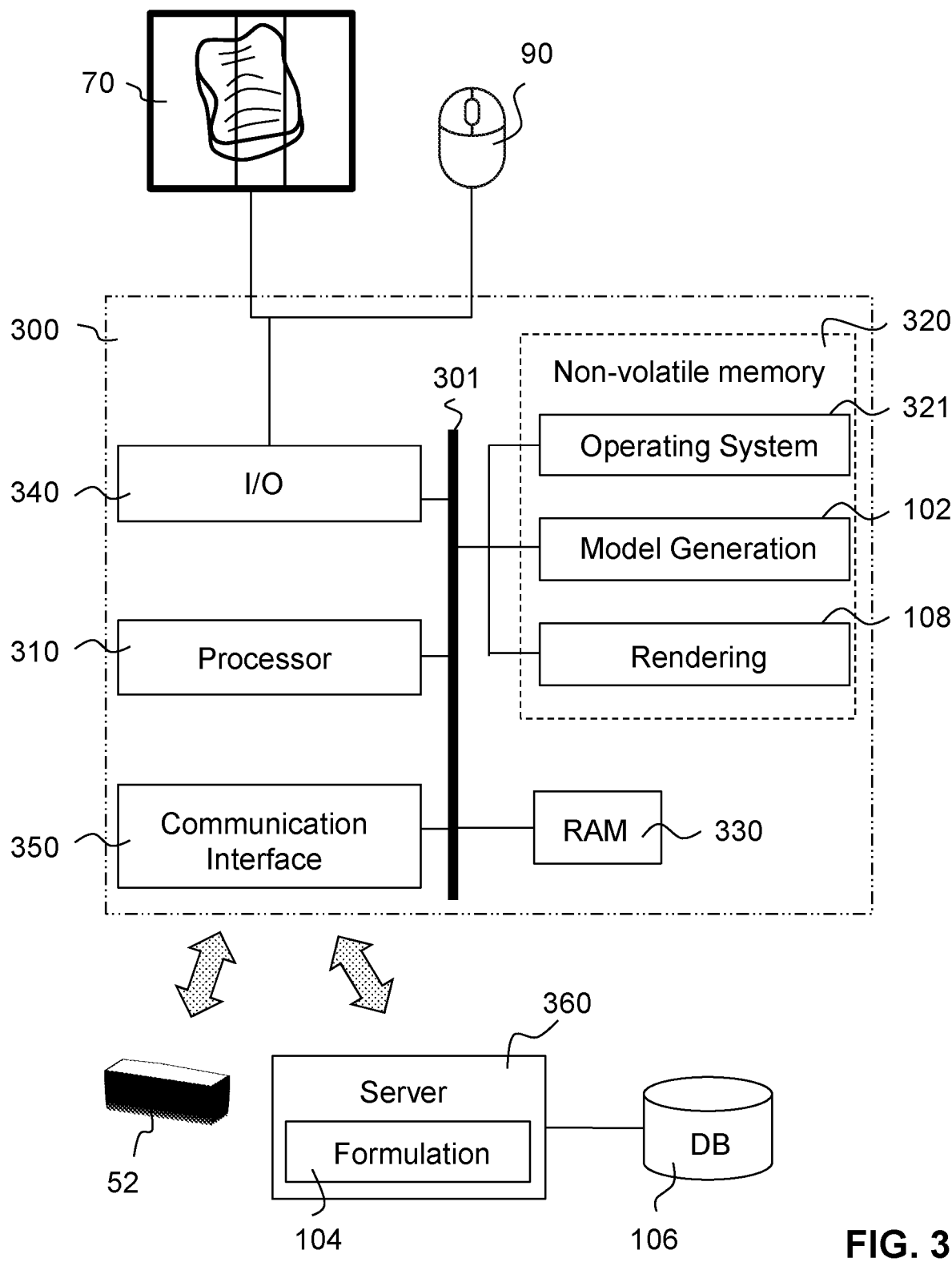
FIG. 3 shows a schematic hardware-oriented illustration of an exemplary color formulation system.

FIG. 3 illustrates an exemplary hardware-oriented block diagram of a computer system that may be used in the method illustrated in FIGS. 1 and 2. In this example, the computer system comprises two main components: a local client computer (e.g., a laptop or tablet computer) 300, which may be located at the body shop, and a remote server computer 360, which may be located at the premises of the paint supplier.

The various components of the local client computer 300 communicate with each other via one or more buses 301, as it is well known in the art. The local client computer 300 comprises one or more processors 310. The processors 310 may comprise, for instance, a single- or multi-core CPU and a GPU, as it is well known in the art. The local client computer 300 further comprises one or more non-volatile memory devices 320, such as a flash memory device and/or a hard disk drive. The non-volatile memory 320 stores, inter alia, the operating system 321 of the local client computer 300 and several application programs, including the model generation software 102 and the rendering software 108. The non-volatile memory 320 further stores user data. The local client computer 300 further comprises random-access memory (RAM) 330, and input/output (1/O) interface 340, and a communication interface 350. Attached to the communication interface are the display device 70 and a pointing device 90. The communication interface 350 may include, e.g., one or more of an Ethernet interface, a WiFi interface, a Bluetooth™ interface etc. The communication interface may serve for communication with the remote server 360.

The remote server computer 360 may be set up similarly to the client computer 300. It stores for execution the formulation software 104. The client computer 360 may include or be connected to the database 106. Communication between the server computer 360 and the client computer 300 may take place via a wired or wireless network, e.g., via a LAN or a WAN, in particular, via the Internet.

The client computer further communicates, via the communication interface 350, with the first and/or second appearance capture devices 52, 82.

In other embodiments, certain functionality of the client computer 300 is instead transferred to the server computer 360. In particular, the server computer, rather than the client computer, may execute the model generation software 102 and/or the rendering software 108. This may be useful if the client computer is a "thin" client with limited computing power.

In yet other embodiments, the computer system consists of only a single computer, which executes all of the above-mentioned software components.

Exemplary Appearance Capture Device

In the above example, the appearance capture devices 52 and 82 are preferably multi-angle spectrophotometers having imaging capabilities. Such devices are known per se. For instance, the MA-TX series available from X-Rite may be used.

Figure 4:
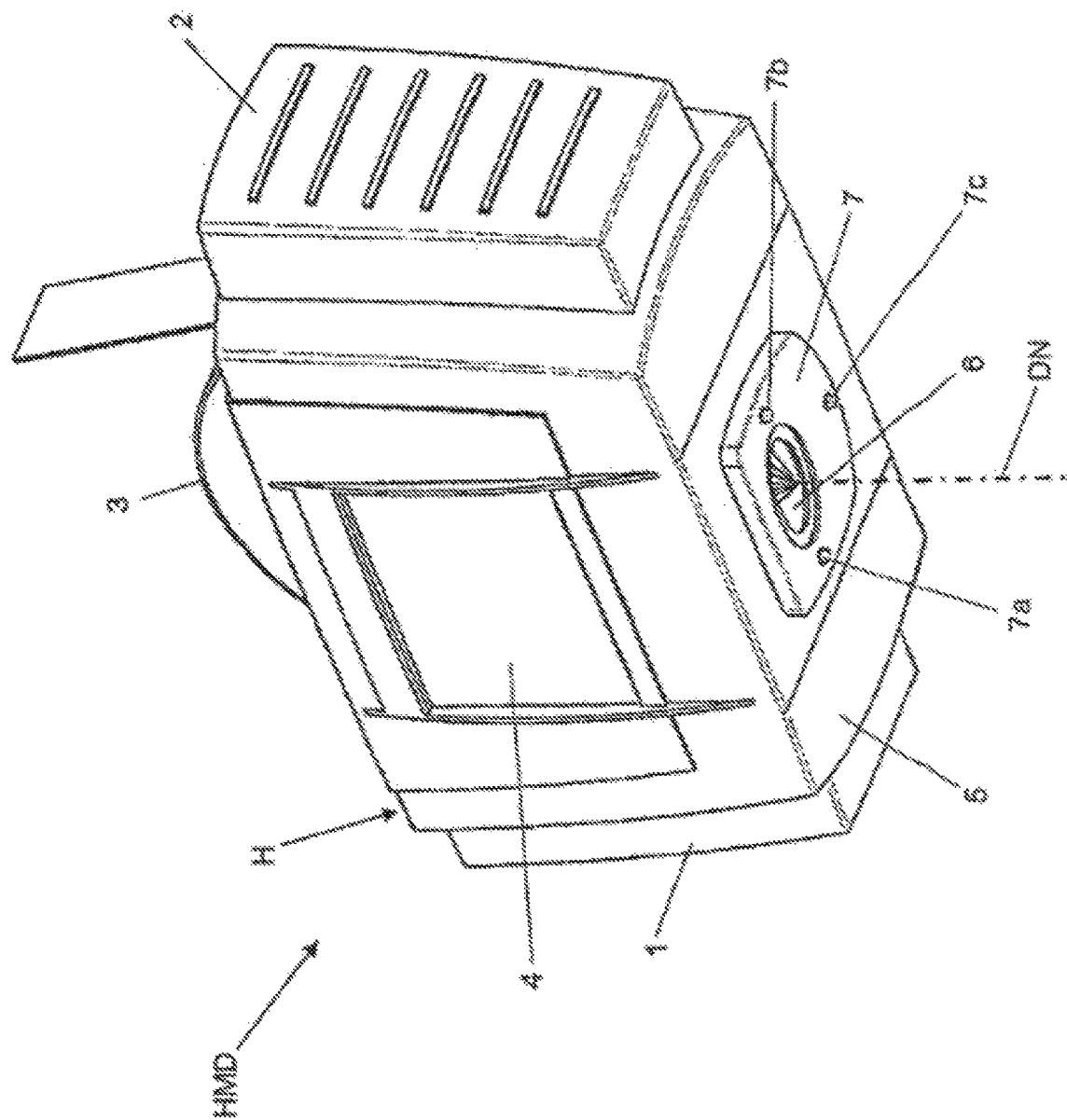
FIG. 4 shows a perspective view of an exemplary appearance capture device according to the prior art.
Figure 5:
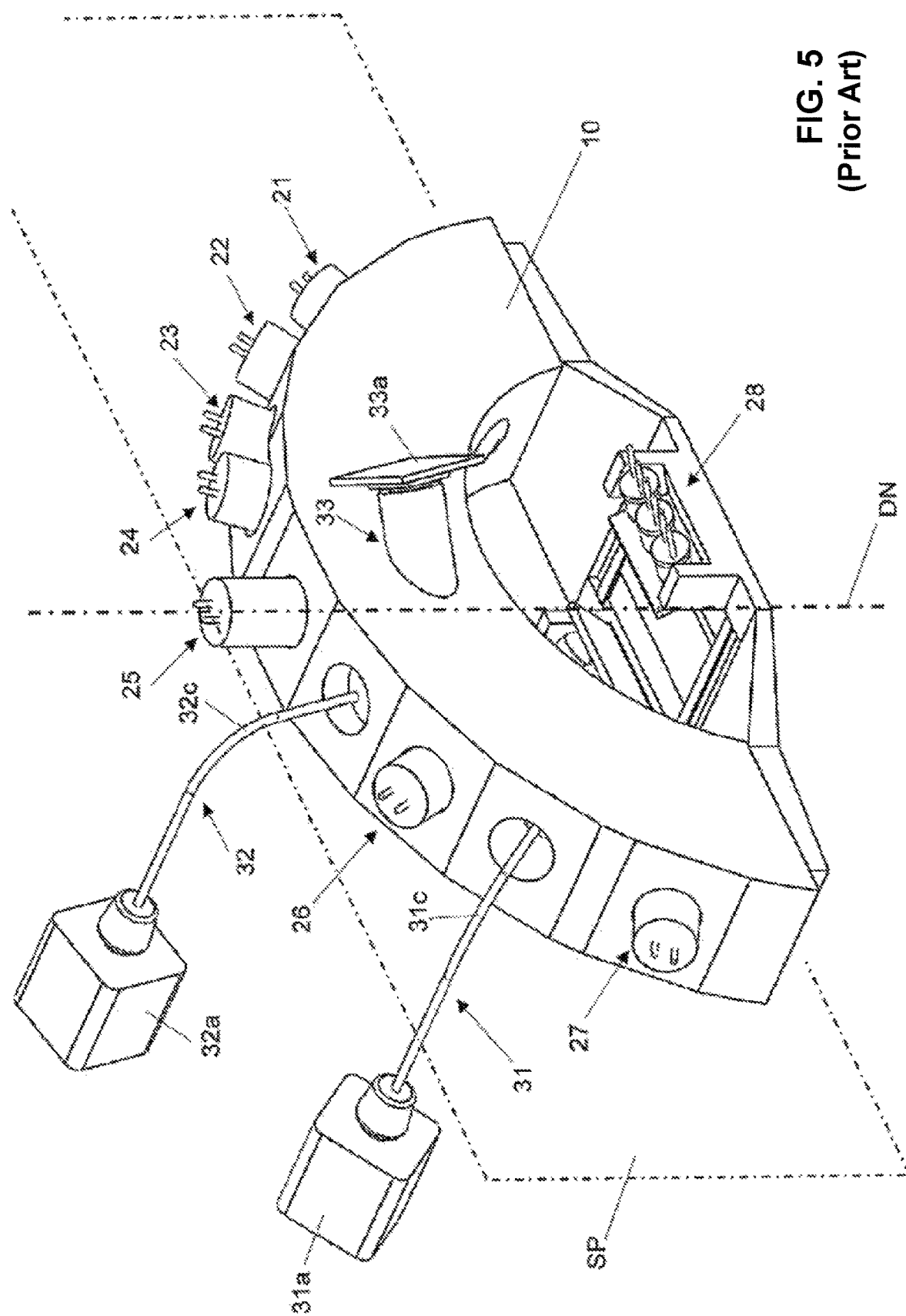
FIG. 5 shows a perspective view of a measurement array of the appearance capture device in FIG. 4.

An exemplary hand-held appearance capture device that may be used in conjunction with the present invention is illustrated in FIGS. 4 and 5. The appearance capture device of FIGS. 4 and 5 is described in greater detail in document US20140152990A1, the contents of which are incorporated herein in their entirety by reference for teaching a handheld appearance capture device.

The appearance capture device is configured for capturing the visual impression of a measurement object. In the following, the appearance capture device is also referred to as a "measurement device" or simply as a "device". In the following, the term "measurement array" is understood to mean the sum of the components of the hand-held measurement device which serve to illuminate a measurement spot on the surface of a measurement object and to capture the light reflected by this measurement spot and to convert it into corresponding electrical signals. The term "device normal" is understood to mean an imaginary straight line which is fixed relative to the device and extends essentially through the center point of the measurement opening of the measurement device and is perpendicular to the surface of the measurement object when the measurement device is positioned on a planar surface of the measurement object. The plane of the measurement opening usually lies parallel to the surface of the measurement object, such that the device normal is also perpendicular to the measurement opening. The term "vertical" is understood to mean the direction of the device normal. Accordingly, vertical sections are to be understood to mean planar sections in a plane that contains the device normal or is parallel to the device normal. In the following description of the measurement device, directions and/or angles are relative to the device normal, which is spatially fixed with respect to the measurement device.

The hand-held measurement device shown in FIG. 4 is indicated as a whole by the reference sign HMD. It comprises a housing H which accommodates a measurement array, illustrated in FIG. 4, and an electronic control array (not shown) which controls the measurement array. Two gripping parts 1 and 2 are embodied laterally on the housing H. A wrist strap 3 is arranged on the upper side of the housing H. A display array 4 is provided on the front side of the housing H. Operating members (not shown) are arranged on the upper side of the housing H.

The lower side of the housing H comprises a housing base 5 reinforced by a base plate 7, which is provided with a measurement opening 6. The housing base 5 comprises an aperture (not indicated by a reference sign) in the region of the measurement opening 6, such that light can exit the interior of the housing through the aperture and the measurement opening 6 and, conversely, light from outside can enter the interior of the housing through the measurement opening 6 and the aperture. Three support members 7a, 7b and 7c are arranged around the measurement opening 6 on the base plate 7 and help in enabling the measurement device to be correctly positioned even on curved measurement surfaces, such that the device normal completely or at least largely coincides with the normal of the measurement surface in the center point of the measurement spot.

The device normal is indicated in FIG. 4 by the reference sign DN. It is perpendicular to the base plate 7 and extends through the center point of the measurement opening 6.

The setup of the measurement array is illustrated in FIG. 5. It comprises an arc body 10 which is fixedly held in the housing H and in which optical and/or photoelectric components of the measurement array are arranged. In the exemplary embodiment shown, these components comprise seven illumination means 21, 22, 23, 24, 25, 26, and 27, and three pick-up means 31, 32, and 33. Additionally, a diffusely illuminating illumination means 28 is also provided in the immediate vicinity of the measurement opening 6.

The seven illumination means 21 to 27 illuminate the measurement spot on the surface of a measurement object along different illumination directions in relation to the device normal DN. For instance, the optical axes of the illumination means 21 to 27 may be oriented at angles of −60°, −45°, −30°, −20°, 0°, +30° and +65° relative to the device normal. All seven illumination means 21 to 27 are arranged such that their optical axes lie in a common plane which contains the device normal DN, in the following referred to as the system plane SP.

Two of the three pick-up means 31 to 33 are embodied as spectral measurement channels; the third pick-up means is embodied as a spatially resolved color measurement channel. The pick-up means receive the measurement light reflected in the region of the illuminated measurement spot of the measurement object at viewing angles of +15° and +45° in the system plane SP. The two pick-up means 31, 32 that form spectral measurement channels comprise two spectrometers 31a and 32a to which the measurement light is fed by means of lenses and optical fibers 31c and 32c. The pick-up means 33 that forms a spatially resolved measurement channel comprises a color-enabled (RGB) camera 33a to which measurement light is applied via a beam splitter and a lens (not shown). The beam splitter is situated in the pick-up beam path of the pick-up means 32 and directs a part of the measurement light at the viewing angle of +15° laterally out of the arc body 10 onto the camera 33a. The pick-up means 32 and 33 thus share the measurement light and receive it at exactly the same viewing angle.

The measurement geometry is the reverse of ASTM standards E2194 and E2539, in which two specular illuminations at 15° and 45° and six specular spectral channels at 0°, 30°, 65°, −20°, −30° and −60° are defined for measurements on metallic and pearlescent effect pigments. One additional illumination means 22 at angle −45° is provided for measuring gloss in combination with the pick-up means 31.

The two spectrometers 31a and 32a spectrally resolve the measurement light fed to them at the viewing angles 45° and 15°, respectively, and respectively produce a set of spectral measurement values per measurement, each measurement value corresponding to intensity in a different wavelength range. The spectrometers 31a, 32a do not spatially resolve the measurement light, i.e., they spectrally resolve the entire measurement light that they receive.

The RGB camera 33a resolves the measurement light fed to it at the viewing angle 15° both spatially and spectrally. Spectral resolution is limited to three channels according to the three colors RGB. The RGB camera correspondingly produces a raw dataset of 3*n measurement values per measurement, wherein n is the number of resolved pixels.

The diffusely illuminating illumination means 28 is provided so that the measurement device also supports a measurement mode with diffuse illumination conditions. The illumination means 28 is configured as an LED background illumination which illuminates the measurement object directly from a large spatial angle. It comprises two rows of white light-emitting diodes arranged on both sides of the measurement opening 6 and two inclined diffusor films, each assigned to one row, for homogenizing the illumination. The two rows of LEDs can be separately controlled by the control array.

Of course, depending on the envisaged application, other types of illumination means can be employed as well.

The hand-held measurement device described above is equipped with seven illumination means and three pick-up means for measuring purposes. It is possible to use other combinations of illumination means and pick-up means. The illumination means need not necessarily be arranged in a plane.

The output of the measurement device comprises a set of appearance attributes. Some of these appearance attributes are color attributes, e.g., in the form of the spectral measurement values determined by the spectrometers or in the form of color values derived therefrom, e.g., RGB, CIELAB or CIEXYZ values. Other appearance attributes are texture attributes, e.g., in the form of the raw image data obtained by the RGB camera or in the form of image data derived therefrom, e.g., in the form of monochromatic greyscale image data. The set of appearance attributes that is obtained from the measurement device is generally sparse compared to the appearance attributes required to generate an instance of an appearance model, as will be discussed in more detail in the next section.

Example of Appearance Model

As already outlined above, many different appearance models have been proposed in the art. In the following, an example will be described, which is particularly useful for describing the appearance of modern vehicle coatings. This exemplary appearance model is a refinement of the model proposed in [RMS+08]. The contents of [RMS+08] are incorporated herein by reference in their entirety for teaching an exemplary appearance model. The presently discussed appearance model is also called the "CPA2 model".

The appearance model assumes that the coating comprises two outermost layers: An opaque or translucent color layer, covered by a smooth transparent clear coat layer. The color layer may contain highly reflective effect particles (so-called "flakes"). Incoming light with direction $\bar{\text{i}}$ is refracted into the clear coat layer before it hits the color layer along a "refracted" incoming direction $\bar{\text{i}}$. Reflected light propagates through the clear coat layer along an outgoing direction $\bar{\text{o}}$ before being refracted into the surrounding air in a direction o. Refraction is modeled by standard geometrical optics, assuming a typical index of refraction for the clear coat layer.

The appearance model of the color layer is separated into three parts:

(a) A monochromatic brightness BRDF part, which models the spatially and wavelength-averaged overall reflection behavior (brightness variation) of the material. The brightness BRFD part may show high frequencies in the angular domain.

(b) A spectral part in the form of a discrete color table, which describes low-frequency angular variations of color (color shifts).

(c) A BTF part in the form of a texture table, which captures the effect of reflecting flakes in the color layer. The BTF part is represented by a plurality of fixed-size images, each image being representative of texture at a particular combination of illumination and viewing angles.

The three parts are combined to one spatially-varying BRDF function representing the appearance of the paint surface:

$$f_{total}(i,o,x) = (1-F(n,i,\eta))(1-F(n,o,\eta))(f_{mono}(\bar{i},\bar{o})$$
$$C(\bar{i},\bar{o})+B(\bar{i},\bar{o},x))+F(n,i,\eta)\delta(i,r(n,o)))$$

Here,
i designates the direction of incident light in air,
the direction of reflected light in air,
x the location on the object surface,
n the surface normal at location x,
$\bar{\text{i}}$ the (refracted) direction of incident light in the clear coat layer,
$\bar{\text{o}}$ the (refracted) direction of reflected light in the clear coat layer,
F(n, d, η) a function to approximate the Fresnel reflection at medium boundaries of relative refractive index η (or the Fresnel formulas themselves),
$f_{mono}(\bar{i}, \bar{o})$ the monochromatic BRDF model from (a),
$C(\bar{i}, \bar{o})$ the interpolated color table from (b),
$B(\bar{i}, \bar{o}, x)$ the interpolated texture table from (c),
$\delta(d_1, d_2)$ the Dirac delta function on O(3), being nonzero only if $d_1=d_2$, and
r(n, d) the direction d reflected at a surface of normal n.

(a) Example of Brightness BRDF Part

The monochromatic brightness BRDF part is modeled using a multi-lobe microfacet-based BRDF model:

$$f_{mono}(\bar{i}, \bar{o}) = \frac{a}{\pi} + \sum_{k=1}^{K} \frac{s_k}{\pi} \frac{D_{\alpha_k}(\bar{h})F(\bar{h}, \bar{i}, F_{0,k})G(\bar{h}, \bar{i}, \bar{o})}{\bar{i}_z \bar{o}_z}$$

Here,
$\bar{h}$ the direction halfway between $\bar{i}$ and $\bar{o}$ (also referred to as the "halfway vector"),
a the diffuse albedo,
K the number of BRDF lobes,
$s_k$ the multiplier for the k-th lobe,
D a microfacet normal distribution function according to the chosen model,
$\alpha_k$ the coarseness parameter for the k-th lobe,
$F_{0,k}$ the parameter for the Fresnel function for the k-th lobe, which might be an index of refraction ratio or the reflection at normal incidence, and
G a so-called geometry term according to the chosen model.

In some embodiments, the Cook-Torrance BRDF model with the Schlick-Fresnel approximation is used. Here, D, F, and G are defined as follows:

$$D_{\alpha_k}(\bar{h}) = \frac{\exp\left(-\frac{\tan^2\theta_h}{\alpha_k^2}\right)}{\pi\alpha_k^2\cos^4\theta_h}$$

$$F(n, d, F_{0,k}) = F_{0,k} + (1 - F_{0,k})(1 - \langle n, d \rangle)^5$$

$$G(\bar{h}, \bar{i}, \bar{o}) = \min\left(1, 2\frac{\bar{h}_z \bar{o}_z}{\langle \bar{o}, \bar{h} \rangle}, 2\frac{\bar{h}_z \bar{i}_z}{\langle \bar{o}, \bar{h} \rangle}\right)$$

Here,
$\theta_h$ designates the polar angle of the halfway vector $\bar{h}$ in an object-fixed reference frame in which the surface normal n defines the z axis ("north pole"),
$\bar{h}_z$, $\bar{o}_z$ and $\bar{i}_z$ designate the z components of the vectors $\bar{h}$, $\bar{o}$ and $\bar{i}$, respectively, in said reference frame.

The free parameters of the model are a, $s_k$, $\alpha_k$, and $F_{0,k}$ for k=[1...K]. Typically, K is chosen to be between 1 and 3.

(b) Example of Spectral Part

The spectral part is modelled by a discrete color table that comprises values of one or more color attributes (e.g., hue and saturation) for a plurality of combinations of directions. The values of the color attributes will in the following be called "color values" for short. Advantageously, the Rusinkiewicz parameterization [Rus98] is employed for indicating directions. In simple embodiments, the color table is bivariate, i.e., the value of the color attribute depends only on the polar angles in the Rusinkiewicz parameterization (halfangle and difference angle), as will be explained in the following. These polar angles will in the following also be called the "coordinates" of the color table.

Figure 6:
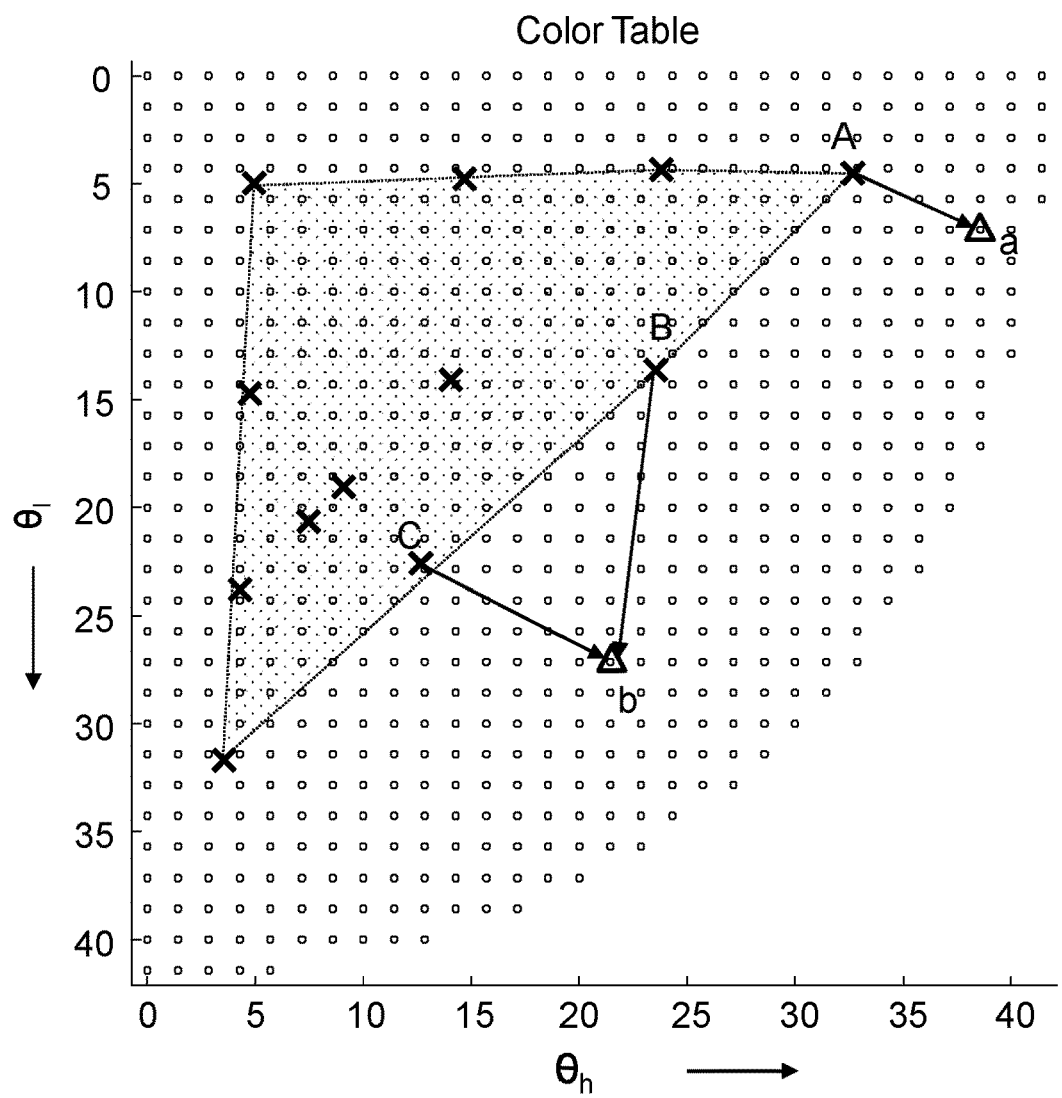
FIG. 6 shows a diagram illustrating an exemplary discrete color table.

An exemplary representation of a bivariate discrete color table is shown in FIG. 6. On the horizontal axis, the halfangle $\theta_h$, i.e., the polar angle of the halfway vector $\bar{h}$, is used as a first coordinate. The halfangle is also called the "flake angle" because it defines the angle between the surface normal n of the paint layer and the normal of a flake in the paint layer that would cause a reflection of the incoming light from the incoming direction $\bar{i}$ into the outgoing direction $\bar{o}$. On the vertical axis, the polar difference angle $\theta_t$ between the halfway vector $\bar{h}$ and the incoming direction $\bar{\iota}$ is used as a second coordinate. The polar difference angle $\theta_I$ corresponds to the polar angle of the incoming direction $\bar{\iota}$ in a transformed reference frame in which the halfway vector $\bar{h}$ defines the z axis. It may be interpreted as indicating the incoming direction relative to the flake normal. The color table contains one or more color values for each pair of coordinates (i.e., each combination of polar angles $\theta_h$ and $\theta_I$). Each pair of coordinates for which the color table contains one or more color values is represented by a circle in FIG. 6. Such a pair of coordinates (combination of polar angles $\theta_h$ and $\theta_I$) will in the following be called a "position" in the color table. The positions in the color table are regularly spaced. The color table is thus represented by a regular rectangular lattice of positions with their associated color values. The positions of two exemplary entries in the color table are marked as "a" and "b".

The appearance model assumes that the paint material has isotropic reflectance. For isotropic materials, color does not depend on the azimuthal angle $\phi_h$ of the halfway vector $\bar{h}$ in the object-fixed reference frame. Therefore, the color table does not consider the azimuthal angle $\phi_h$.

Furthermore, the model assumes that the effect particles ("flakes") themselves also have isotropic reflectance, and that color shifts are dominated by the specular component of the reflected light. Therefore, color only weakly depends on the azimuthal angle $\phi_I$ of the incoming direction $\bar{\iota}$ in the transformed reference frame. For this reason, the color table does not consider the azimuthal angle $\phi_I$ either.

The empty area at large values of $\theta_h$ and $\theta_I$ in the color table of FIG. 6 indicates combinations of "forbidden" angles, which are physically impossible due to refraction and total reflection at the interface of the clear coat layer with the surrounding air. The color table does not contain any color values for these combinations of angles.

(c) Example of BTF Part

The appearance model includes a bidirectional texture function (BTF) model. Generally speaking, a BTF model is a multi-dimensional function depending on planar texture coordinates (x,y) as well as on view and illumination spherical angles. The BTF part is modelled by a discrete texture table. Each entry in the texture table is a texture slice, i.e., an image that is representative of the effect of flakes for a particular combination of illumination and viewing directions. In simple embodiments, the Rusinkiewicz parameterization is also used for the texture table, and the texture table is again bivariate, being again parameterized by the angles $\theta_h$ and $\theta_I$.

Figure 7:
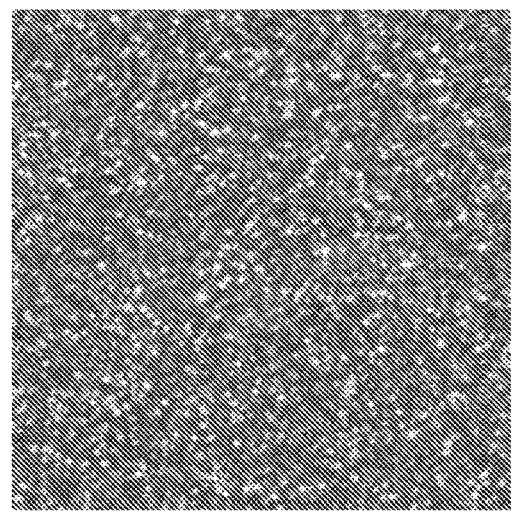
FIG. 7 shows an exemplary texture of a discrete texture table.

A simplified example of a texture slice is shown in FIG. 7. Bright spots in this Figure indicate reflections by flakes whose flake normal is oriented at the associated flake angle $\theta_h$ and which are visible at the associated difference angle $\theta_I$.

Figure 8:
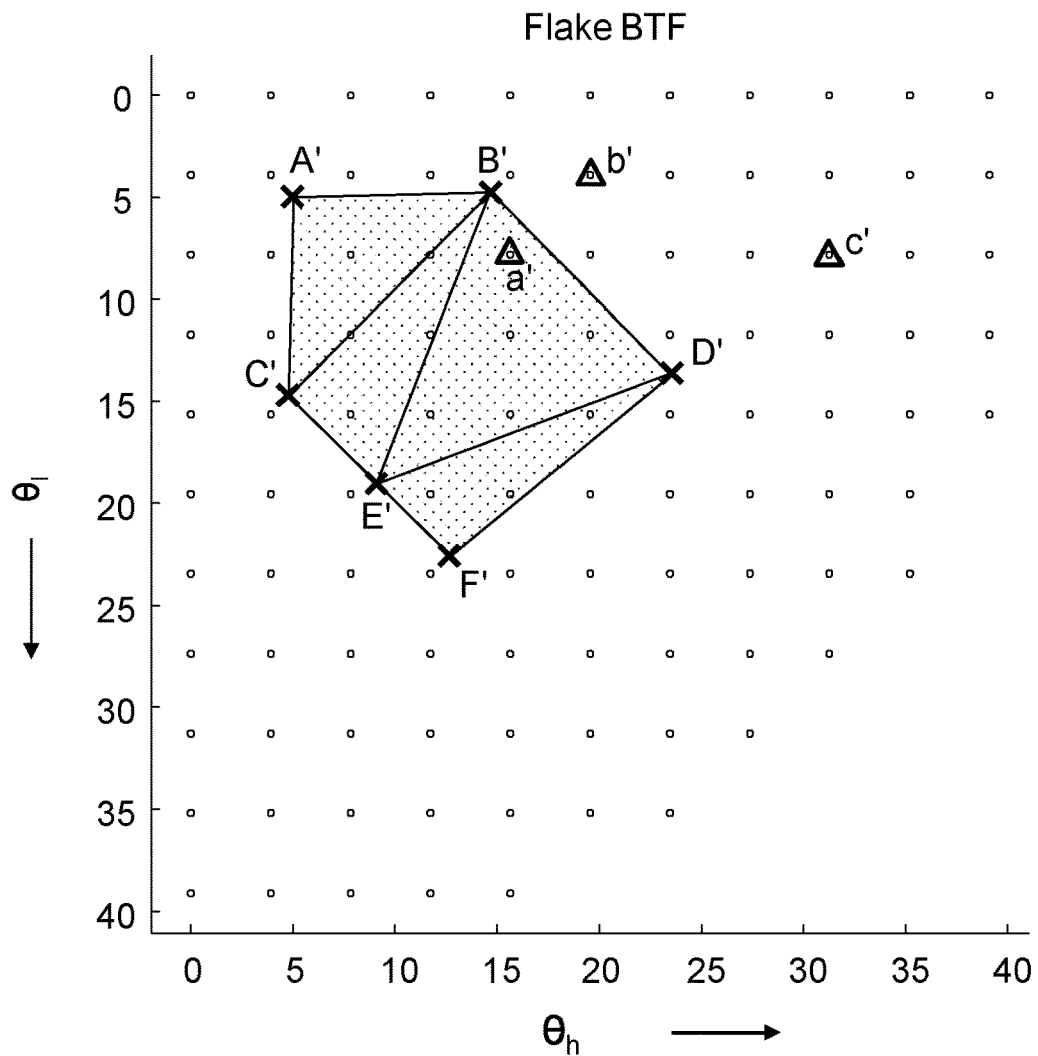
FIG. 8 shows a diagram illustrating an exemplary discrete texture table.

FIG. 8 illustrates the discrete nature of the bivariate texture table. In the appearance model, texture slices are provided for the discrete positions (defined by their coordinates $\theta_h$, $\theta_I$) marked by circles. The spacing between the discrete values of $\theta_h$ and $\theta_I$, respectively, may be larger in the texture table than in the color table on account of the higher storage space requirements for each texture slice as compared to the color values in the color table. As in the color table, for the texture table does not have any entries for the "forbidden" angles. The positions of three exemplary texture slices are marked as a', b', and c'.

Generating an Instance of the Appearance Model

In the presently proposed method, only a limited set of appearance attributes for a limited number of combinations of directions $\bar{\iota}$, $\bar{o}$ is available from measurements using a handheld appearance capture device or from formulation software. These appearance attributes are generally not available for the same combinations of directions of incoming and outgoing light as those required by the discrete color and texture tables in the appearance model. Furthermore, the available appearance attributes are not necessarily of the same type as those required by the appearance model. For instance, the available appearance attributes usually do not include the parameters of a monochromatic brightness BRDF model as described above.

For generating an instance of the appearance model, it is therefore necessary to determine the appearance attributes of the appearance model from the limited set of available appearance attributes. It should be noted that the set of appearance attributes of the appearance model may have much larger cardinality than the limited set of available appearance attributes. Therefore, generating an instance of the appearance model may involve inter- and extrapolation.

As already discussed above, the free parameters of the brightness BRDF part are a, $s_k$, $\alpha_k$, and $F_{0,k}$ for $k=[1..K]$. These parameters can be determined using non-linear optimization as known in the art [RMS+08].

Next, the bivariate color table needs to be filled. Color attributes may be available only for a few pairs of angles $\theta_h$ and $\theta_I$, marked by crosses in the diagram of FIG. 6. Each pair of angles ($\theta_h$, $\theta_I$) for which color attributes are available will in the following be called a "sample point". The sample points define a convex hull, shown in FIG. 6 as a dotted area. Each position ($\theta_h$, $\theta_I$) for which color values are required in the bivariate color table will be called a "destination position". In the present example, the destination positions are distributed on a regular grid, and accordingly these positions might also be called "grid points". The color values at the destination positions will be called the "destination color values". They may be in the same format as the available color attributes, or they may be in a different format. For instance, the available color attributes may comprise spectral data, while the color table may comprise reduced values (e.g., trichromatic values like RGB, tristimulus data like CIEXYZ, or values in another color space like CIELAB). For the following discussion, it is assumed that a transformation between the format of the available color attributes at the sample points and the format of the color values in the color table is known.

The color values at the destination positions can readily be inter- and extrapolated from the available color attributes at the sample points by standard inter- and extrapolation procedures. If the format of the color values in the color table is different from the format of the available color attributes at the sample points, the necessary transformation can be applied before or after inter-/extrapolation as long as both the available color attributes at the sample points and the color values in the color table are expressed in a linear color space. If the color values in the color table are not expressed in a linear color space (e.g., as CIELAB values), inter-/extrapolation is first carried out in a linear color space, and only then the transformation is applied.

For instance, for interpolation within the convex hull, nearest-neighbor interpolation, inverse distance weighting [Sh68], or Gaussian process regression [W98] between the color attributes at the available sample points or between color values obtained from these color attributes by said transformation can be used, as it is well known in the art.

In preferred embodiments, for extrapolation at destination positions outside the convex hull having lower $\theta_h$ than the smallest $\theta_h$ of the convex hull or higher $\theta_h$ than the largest $\theta_h$ of the convex hull, the color attributes (or derived color values) at the nearest-neighbor sample point can be used.

The nearest-neighbor sample point is to be understood to be that sample point that has the smallest Euclidean distance $\sqrt{\Delta\theta_h{}^2 - \Delta\theta_I{}^2}$ from the destination position. In FIG. 6, this is illustrated for destination position "a". The color value at destination position "a" is derived from the available color attributes at sample point A, which is the nearest-neighbor sample point from destination position "a".

For extrapolation at all other destination positions outside the convex hull, in particular, those having low or high $\theta_I$, a preferred embodiment would not only use the nearest-neighbor sample point, but would rather interpolate between the color attributes (or derived color values) of those two sample points that are closest to the destination position. In FIG. 6, this is illustrated by the entry at destination position "b". The two closest sample points are points B and C. The color value at destination position "b" would therefore be determined by interpolation between the color attributes (or derived color values) at sample points B and C.

Of course, other "well-behaved" interpolation and extrapolation methods, as they are known in the art, can be used as well.

Finally, the bivariate texture table needs to be filled. Texture samples in the form of images may be available only for a few pairs of angles $\theta_h$ and $\theta_I$, in the following again referred to as "sample points". For instance, as mentioned above, the appearance capture device 52 may have one or multiple cameras. The available texture samples may be image data for multiple illumination angles and a single viewing angle (e.g., in the case of a single RGB camera) or sets of image data for multiple illumination angles and multiple viewing angles (e.g., in the case of multiple RGB cameras).

In the example of FIG. 8, only six texture samples are available. The corresponding sample points are marked by crosses in FIG. 8 and labelled as A', B', C', D', E' and F'. The convex hull of these sample points is again shown as a dotted area. The texture samples at the sample points are called the "source textures". The pairs of angles $\theta_h$, B for which texture slices need to be determined to fill the bivariate texture table are again called "destination positions" having "destination coordinates". As in the case of the color table, in the present example these points are arranged on a regular grid, and may therefore as well be called "grid points". The texture slices at the destination positions are accordingly called "destination textures". They can be determined from the available source textures as follows:

For each destination position $(\theta_h, \theta_I)$ in the texture table, it is determined whether this destination position is inside the convex hull.

If the destination position is inside the convex hull, the destination texture at this destination position is interpolated from the surrounding source textures using "statistical texture synthesis", as explained in more detail below. For instance, for position a' in FIG. 8, statistical texture synthesis would be used.

If the destination position is not inside the convex hull, either the source texture of the nearest-neighbor sample point is used for defining the destination texture ("first strategy"), or a constant texture without any spatial variations is used, i.e., an "empty" texture that does not contain any reflections from flakes ("second strategy"). In one possible implementation, the first strategy may be employed for values $\theta_h$ that are smaller than the largest $\theta_h$ of the available sample points, and the second strategy for $\theta_h$ that are larger than the largest $\theta_h$ of the available sample points. For instance, for position b' in FIG. 8, the first strategy would be appropriate, while for position c', the second strategy may be used. It is also possible to use statistical texture synthesis for destination positions that are outside the convex hull as long as at least two sample points are sufficiently close to the destination position. For instance, it may be appropriate to use statistical texture synthesis for destination position b', using the source textures at sample points B' and D'.

Statistical Texture Synthesis

An exemplary embodiment of statistical texture synthesis for destination position a' in FIG. 8 will now be explained with reference to FIGS. 9 to 13.

Initially, three source textures at different sample points are selected for destination position a'. To this end, a Delaunay triangulation is created for all sample points A' to F'. In two dimensions, as in the present example, the result of the Delaunay triangulation is a set of triangles. The edges of the resulting triangles are illustrated by straight lines between the various sample points A' to F' in FIG. 8. Now, the triangle that contains the destination position a' is selected, and the sample points at the corners of this triangle are determined. In the present example, these are the sample points B', D', and E'. For the subsequent procedure, the source textures at these three sample points are used.

Next, interpolation weights for these three source textures are determined. To this end, the absolute barycentric coordinates of the destination position a' with respect to the selected triangle are determined, i.e., non-negative barycentric coordinates $\lambda_1, \lambda_2, \lambda_3$ fulfilling the condition $\lambda_1 + \lambda_2 + \lambda_3 = 1$. These barycentric coordinates are then used as the interpolation weights for the source textures at the corners of the selected triangle. In the example of FIG. 8, the absolute barycentric coordinate with respect to sample point B' is rather large, while the absolute barycentric coordinates with respect to sample points D' and E' are much smaller. Accordingly, the source texture at sample point B' will receive a comparatively large interpolation weight, while the interpolation weights for sample points D' and E' will be much smaller. For all other source textures, the interpolation weight is set to zero.

Now a destination texture is synthesized for the destination position a' from the three source textures at sample points B', D', and E'. This will be explained with reference to FIG. 9.

Figure 9:
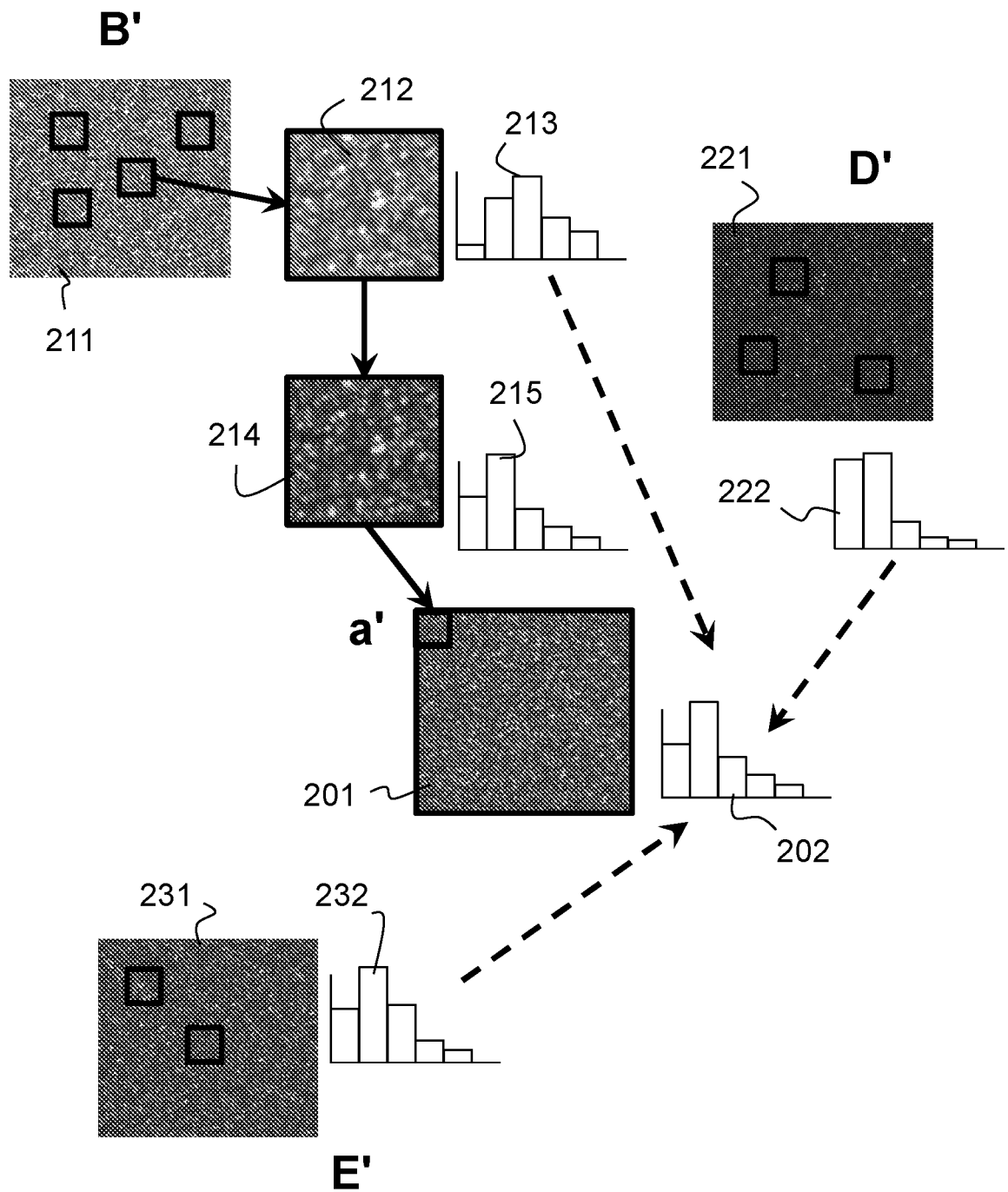
FIG. 9 shows a schematic illustration of a method for generating a destination texture based on a plurality of source textures.

To this end, one of the three source textures is randomly chosen with a probability that is proportional to its interpolation weight. In the example of FIG. 9, the source texture 211 at sample point B' has been randomly chosen.

From this source texture 211, a texture patch, i.e., a small portion of the source texture, is now extracted at a random position within the source texture, indicated by a small rectangle in the source texture. In the example of FIG. 9, texture patch 212 is extracted. The extracted texture patch 212 is now modified so that one of its statistical properties at least approximately matches a corresponding averaged statistical property. In the present example, the extracted texture patch 212 is modified such that its pixel value histogram approximately matches an averaged pixel value histogram 202. This will now be explained in more detail.

Figure 10:
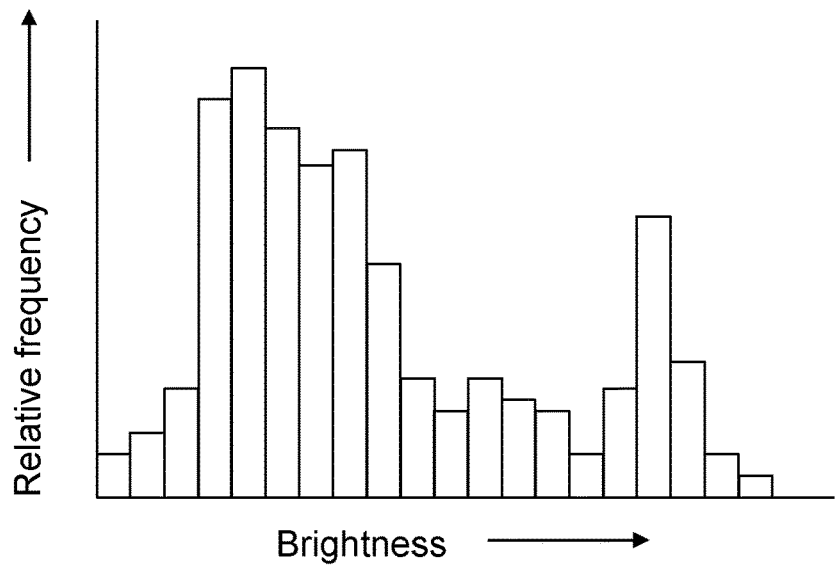
FIG. 10 shows a schematic pixel value histogram.

An exemplary pixel value histogram is illustrated in FIG. 10. The pixel value histogram contains a plurality of relative frequency values, one such value for each discrete pixel value in an image. For instance, if the pixel values range from 0 to 255, the pixel value histogram will comprise, for each pixel value between 0 and 255, the relative frequency of that pixel value in the image. In some embodiments, the pixel values may be binned, each bin corresponding to a range of pixel values, and the pixel value histogram may accordingly comprise a reduced number of relative frequency values, each value representing the relative frequency of pixel values in one of the bins. The pixel value histogram can be used for assessing the distribution of brightness in an image, including overall brightness and contrast. For instance, the pixel value diagram of FIG. 10 would indicate that the image contains some bright spots or areas before a relative dark background.

In FIG. 9, all pixel value histograms are shown in a much simplified manner as having only five bins each. The pixel value histogram of source texture 211, from which texture patch 212 was extracted, is shown as histogram 213. The averaged pixel value histogram is shown as histogram 202. This averaged histogram has been obtained as a weighted average of the pixel histograms 213, 222, and 232 of the three source textures 211, 221 and 231 at sample points B', D', and E', respectively, the weights being the interpolation weights as determined above. The pixel values of texture patch 212 are now modified so as to obtain a pixel value histogram that more closely matches the average pixel value histogram 202. Modification is carried out by applying a monotonically non-decreasing point-wise transformation to each pixel value in texture patch 212. Histogram-matching algorithms for finding a suitable transformation are well known in the art of digital image processing in connection with brightness and contrast modification. The modified texture patch is illustrated as texture patch 214, and the resulting pixel value histogram is illustrated as histogram 215. The resulting pixel value histogram 215 now closely matches the averaged pixel value histogram 202.

The modified texture patch 214 is now inserted into the destination texture 201 so that it seamlessly fits to the texture content already in the destination texture 201. To this end, the first modified texture patch 214 may simply be placed in a corner of the destination texture 201. Each subsequent texture patch is inserted onto the destination texture by a technique called "MinCut" or "Graphcut". Reference is made to document [Kw03]. Very briefly stated, a seam that enforces visual smoothness between the existing pixels and the newly placed patch is computed. The texture patch and the already existing content are stitched together along this seam.

Figure 11:
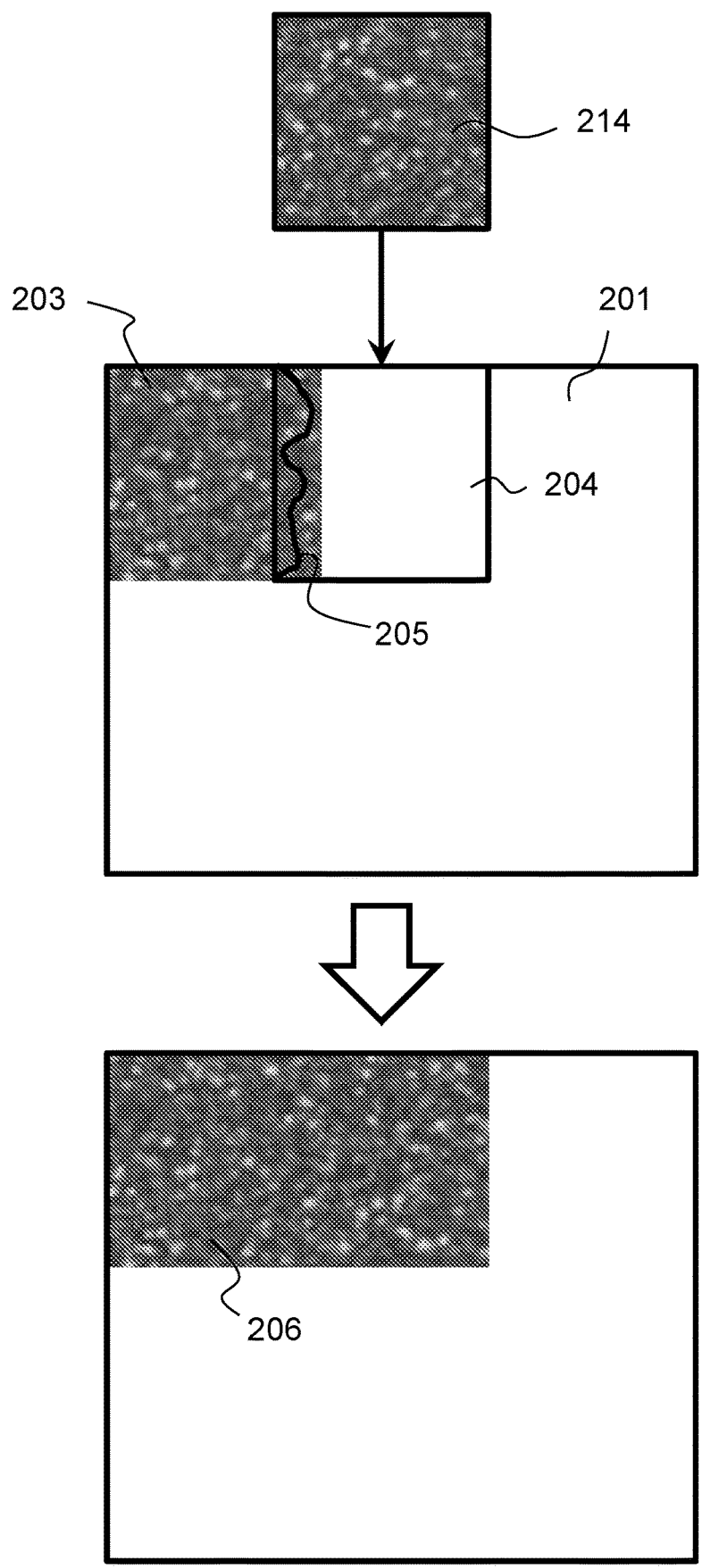
FIG. 11 shows a schematic illustration of the insertion of a texture patch into the destination texture.

One such insertion step is illustrated in FIG. 11. In this example, a modified texture patch 214 is to be inserted into a destination texture 201 that already comprises a texture patch 203. The position 204 of the newly inserted patch 214 is chosen such that the newly inserted patch 214 overlaps with the existing patch 203. A seam 205 is computed in the region of overlap such that the existing pixels along the seam and the newly inserted pixels appear to be visually smooth, i.e., that no visible boundary is created along the seam, as explained in detail in [Kw03]. The existing patch 203 and the newly inserted patch 214 are stitched together along this seam, the remainder of each patch being discarded. This results in a larger patch 206.

This procedure is now repeated as often as necessary to completely fill the destination texture 201.

Flow Diagram for Filling a Discrete Texture Table

Figure 12:
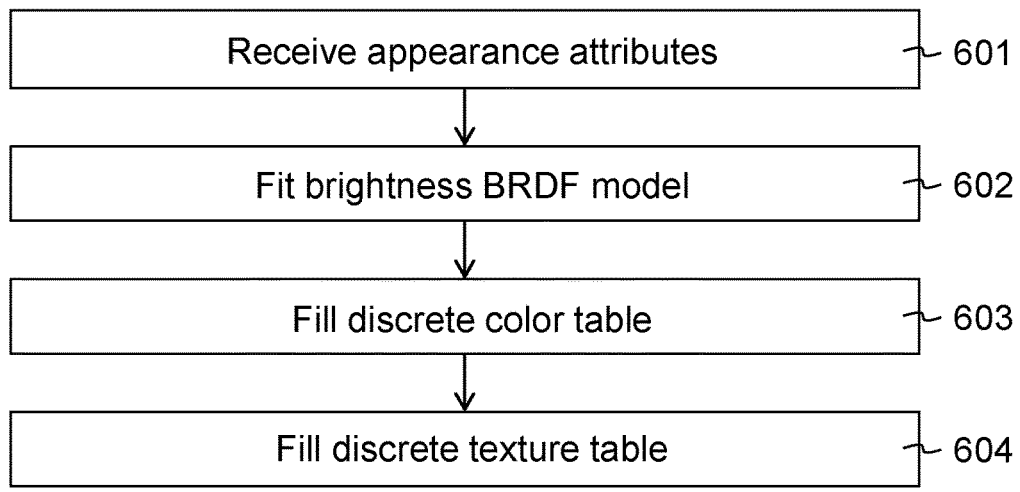
FIG. 12 shows a flow diagram of a method for generating an instance of an appearance model.

FIG. 12 shows a flow diagram that illustrates an exemplary procedure of generating an instance of the appearance model. In step 601, the model generation software receives the set of available appearance attributes, which may have been determined by an appearance capture device measuring a target object 50 or by formulation software determining constituents of a candidate formula 60, including the constituents' proportional amounts in the candidate formula 60. In step 602, the software carries out a fit of the brightness BRDF model to the available appearance attributes. In step 603, the software fills the discrete color table, based on the available appearance attributes. In step 604, the software fills the discrete texture table, based on the available appearance attributes. To this end, it determines the destination textures that form the entries of the discrete texture table.

Flow Diagram for Statistical Texture Synthesis

Figure 13:
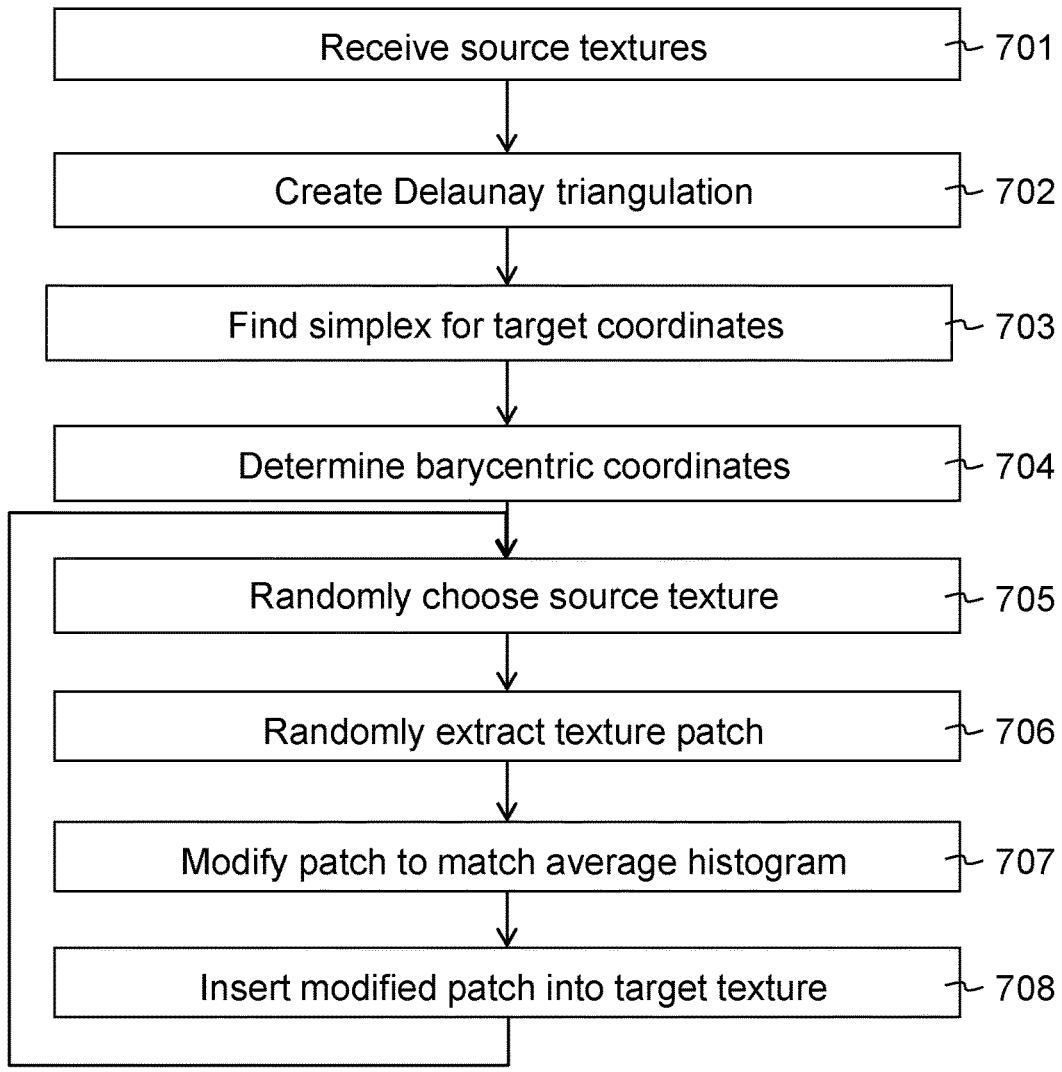
FIG. 13 shows a flow diagram of a method for generating a destination texture based on a plurality of source textures.

FIG. 13 shows a flow diagram that illustrates an exemplary procedure of determining a destination texture associated with a set of destination coordinates. In step 701, the model generation software receives a plurality of source textures and their associated coordinates. In step 702, the software creates a Delaunay triangulation. In step 703, the software identifies that simplex of the Delaunay triangulation that contains the destination coordinates. In step 704, the software determines the barycentric coordinates of the destination coordinates with respect to the identified simplex and stores these as interpolation weights. In step 705, the software randomly chooses one of the source textures at the corners of the selected simplex with a probability according to its interpolation weight. In step 706, the software randomly extracts a texture patch from the chosen source texture. In step 707, the software modifies the patch to match its pixel value histogram to an average pixel value histogram. In step 708, the software inserts the modified patch into the destination texture such that it seamlessly fits the existing texture content in the destination texture. Steps 705 to 708 are repeated until the destination texture is completely filled. The completed destination texture may then be used as an entry in the discrete texture table.

Computing the Texture Table of a Mixture

When computing the entries of a discrete texture table for a material that is a mixture of several constituents (e.g., of the candidate material, which is a mixture of constituents according to a recipe determined by formulation software), statistical texture synthesis may be likewise employed. In this case, the source patches may be randomly sampled from source textures associated with the different constituents with probabilities according to their concentrations in the mixture and to their interpolation weights.

Combinations of Different Appearance Capture Devices

In the above-discussed workflow, appearance attributes of three types of objects are determined by measurements: the target object, the trial object, and reference objects that have been produced for the various reference materials. These measurements will generally take place at different locations. For instance, in the case of vehicle repair, measurements on the target object are carried out in a body shop, measurements on the trial object will generally be carried out by the paint supplier, and measurements of drawdowns for the reference materials will generally be carried out in a paint development lab.

Accordingly, these measurements will generally not be carried out by the same appearance capture device. If the same type of appearance capture device is used for measurements of all three types of objects, only inter-instrument calibration is required. However, generally different types of appearance capture device may be used at the different locations, possibly with different degrees of sophistication. For instance, the body shop might use only a relatively simple handheld multi-angle spectrophotometer without imaging capabilities, such as X-Rite's MA-5 instrument, for measuring the target object, while the paint supplier might use a more sophisticated handheld multi-angle spectrophotometer with imaging capabilities, such as X-Rite's MA-T6 or MA-T12 instruments, for measuring the trial object, and the paint development lab might determine the properties of the reference materials using a highly sophisticated stationary appearance capture device like X-Rite's TAC7 instrument, having a large number of illumination and viewing directions and highly sophisticated imaging capabilities.

Measurement geometries for multi-angle spectrophotometers are typically defined in terms of observation, illumination, and specular reflection angles. For example, for pick-up optics at an observation angle of 45° from normal (perpendicular) to a target surface to be measured, the specular reflection angle for such an observation angle would be 45° on the opposite side of the surface normal. An illumination angle of 0° from surface normal is 45° from the observation angle and at an aspecular 45° from the specular reflection, and is identified as 45as45. For the same observation angle (45), an aspecular illumination angle of 25° closer to the observation angle from the specular reflection would be identified as 45as25. For the same observation angle, an illumination angle of 15° farther away from the observation angle relative to the specular reflection would be identified as 45as-15. For each example provided herein, due to the principle of reciprocity, the observation and illumination angles may be interchanged. That is, an illumination angle of 0° from surface normal and an observation angle of 45° from surface normal should produce the same result as an observation angle of 0° from surface normal and an illumination angle of 45° from surface normal.

A spectrophotometer that includes measurement geometries of 45as15, 45as25, 45as45, 45as75 and 45as110 would be considered a five-angle spectrophotometer. Adding another illumination source, for example, at −15° from specular reflection, would add 45as-15 measurement geometry, resulting in a six-angle spectrophotometer. In some examples, a second set of pick-up optics is added at 15° from surface normal. The specular reflection angle for such an observation angle would be 15° on the opposite side of surface normal. Keeping the same illumination angles, this results in measurement geometries of 15as-45, 15as-15, 15as15, 15as45, 15as80. An additional measurement geometry of an observation angle of 15 from normal and an illumination angle of −5° from specular would also be available, but may be too close to specular to provide a useful measurement. Three angle spectrophotometers also exist, having, for example, measurement geometries of 45as15, 45as45, and 45as70, or 45as15, 45as45, and 45as110

Figure 14:
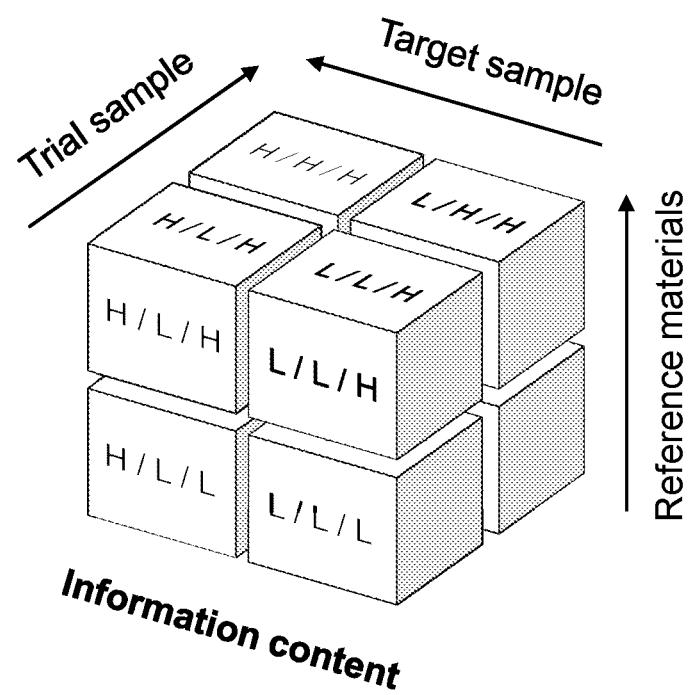
FIG. 14 shows a schematic diagram illustrating variations in information content along three dimensions.

Accordingly, the available information content associated with the three types of objects may be different. This is illustrated in FIG. 14, which schematically illustrates variations in information content along three dimensions: The first dimension is the available information content for the target object, the second dimension is the available information content for the trial object, and the third dimension is the available information content for the reference materials. The available information content may vary along each of these dimensions between "L" ("low", color attributes available for only a small number of combinations of illumination and viewing directions, no texture attributes available) and "H" ("high", both color attributes and texture attributes available, each for a large number of combinations of illumination and viewing directions).

Possible strategies for dealing with different levels of information content will now be discussed.

(a) Information Content is High for Target Object, Trial Object and Reference Materials (Box "H/H/H" in FIG. 14)

Ideally, the information content is high for each of the three dimensions, i.e., color attributes for a large number of combinations of illumination and viewing directions as well as texture attributes in image form for a considerable number of combinations of illumination and viewing directions are available for the target material, for the trial material and for each reference material. In this case sufficient information is directly available for visualizing the appearance of the target material based on the measured appearance attributes of the target object and for generating a first instance of the appearance model to this end. There is also sufficient information for determining a suitable candidate recipe for which a good match with the appearance of the target material is expected, for visualizing the appearance of the candidate recipe based on the available appearance attributes of the reference materials, and for generating a second instance of the appearance model to this end. Finally, there is also sufficient information for visualizing the trial material and for generating a further instance of the appearance model to this end, and for evaluating whether the appearance of the trial material actually matches the appearance of the target material by determining a suitable difference norm and/or by visually comparing the visualizations of the target material and the trial material. The above-described procedures of color inter- and extrapolation and statistical texture synthesis may directly be used without modifications in order to generate the involved instances of an appearance model which includes both color and texture.

(b) Information Content is Low for Target Object, but High for Trial Object and Reference Materials (Box "L/H/H" in FIG. 14)

In some embodiments, measurements on the trial object and the reference objects are carried out using appearance capture devices that have both spectrophotometric and imaging capabilities (i.e., the associated information content is high), while measurements of the target object are carried out using a simpler device that only has spectrophotometric capabilities, but no imaging capabilities (i.e., the associated information content is low).

Then the problem arises how to visualize the appearance of the material of the target object in a realistic manner despite the absence of measured texture attributes for this material.

In this case there are at least two conceivable strategies. In a simple strategy, the entire virtual object is simply visualized without texture. To this end, the first and second instances of the appearance model may both be generated with an "empty" texture table, i.e., with a texture table whose entries are all identical and do not exhibit any spatial variations. Equivalently, an appearance model that does not include texture may be used for visualizing the virtual object.

However, this procedure might not yield a reasonably realistic impression of the appearances of the materials of the target object and of the candidate recipe, and therefore it may be difficult to judge whether these appearances actually match.

Therefore, in a preferred strategy, the texture of the target object is predicted based on the known texture attributes associated with the reference materials. Once a trial object has been produced, texture prediction for the trial object may additionally be based on the texture attributes of the trial object. In other words, texture information associated with the reference materials and/or the material of the trial object is used to visualize the appearance of the target material. To this end, the first instance of the appearance model may be "edited" using texture information that belongs to another instance of the appearance model, i.e., texture information associated with the target material is replaced or modified by texture information associated with a different material. Methods for "editing" an appearance attributes in this manner are described below and in US20150032430A1, the contents of which are incorporated herein by reference in their entirety.

Similar strategies may also be used if a limited number of texture attributes are available for the target material, these texture attributes however being insufficient for generating the texture part of the first instance of the appearance model in a meaningful manner or containing less texture information than the texture information that is available for the reference materials and/or for the trial object. For instance, the first appearance capture device may be a multi-angle spectrophotometer that is configured to determine color attributes and only one or a few global texture attributes, e.g., a global coarseness parameter or a global sparkle parameter. In contrast, the available texture attributes for the reference materials and/or for the trial object may include image data for several combinations of illumination and viewing directions. In this case, the texture attributes associated with the target object may be modified to include image data derived from the available image data of the reference materials and/or of the trial object. The image data that will be associated with the target object should of course be consistent with the available measured texture attributes of the target object, e.g., with measured global parameters such as coarseness or sparkle parameters. This may be ensured by appropriately modifying pixel values in the available image data of the reference and/or trial materials such that a global parameter computed from the modified image data corresponds to the measured global parameter, respectively, of the target object.

The methodology for modifying the pixel values may be very similar to the above-described methodology in the context of statistical texture synthesis, where a texture patch is modified such that its pixel value histogram approximately matches an averaged pixel value histogram. It is noted that both a pixel value histogram and a global coarseness or sparkle parameter represent examples of statistical properties associated with image data. Similarly to the above example of statistical texture synthesis, also in the present example an image is modified such that one of its statistical properties (here: a global parameter computed from the image data) approximately matches a measured statistical property of the target object (here: a measured global parameter of the target object).

The limited texture attributes that are measured for the target object may also be different from a global parameter. For instance, the measured texture attributes may comprise one single image for one single combination of illumination and viewing directions. Regardless of the exact nature of the measured texture attributes, additional images for the target material may be generated by modifying pixel values of the available images associated with the target material, the reference materials and/or the trial object in such a manner that at least one statistical property of the modified image data approximates a corresponding statistical property associated with the measured texture attributes of the target object.

The suggested procedure of texture prediction is based on the assumption that the texture of the target material will be reasonably similar to the texture of the candidate recipe as long as the ingredients of the candidate recipe belong to the same class of materials as the ingredients of the target material. For instance, if it is known that the target material comprises a certain type of flakes, and if the candidate recipe includes such a type of flakes, it is reasonable to assume that the texture of the target material will at least be close to the texture of the candidate recipe.

Similar strategies may also be employed if the available color attributes of the target material are insufficient for reliably fitting the color attributes required by the used appearance model. This may be the case, for instance, if the used multi-angle spectrophotometer has an insufficient number of pairs of illumination and viewing directions for determining the color attributes of the target material. In this case, also the color attributes of the appearance model may be determined by "editing", using procedures as described below and as further disclosed in US20150032430A1, in a similar manner as the above-described editing process for texture attributes.

In one example, appearance measurements from a higher information measurement are used to enhance appearance measurements for a lower information measurement. For example, at a vehicle repair facility, measurements of a target surface may be obtained from a three-angle spectrophotometer at measurement geometries of 45as15, 45as45, and 45as110. However, measurements of a corresponding reference material may have spectral information measured by a six-angle spectrophotometer at measurement geometries of 45as-15, 45as15, 45as25, 45as45, 45as75 and 45as110.

In some embodiments, the measurements of the reference material from the measurement geometries of 45as-15, 45as25, and 45as75 are added to the measurements of the target surface from the three-angle spectrophotometer and a color table is computed from the combined measurements as described with respect to FIG. 6. In some embodiments, the system first confirms that the target material and reference material have similar constituent components. This may be achieved, for example, by inputting vehicle information, such as VIN, paint codes, make, model and year, etcetera into the system and comparing with data about the reference materials in database 106.

In some embodiments, measurement information from measurement geometries in common between the measurements is compared. For example, measurement information from three-angle spectrophotometer at measurement geometries of 45as15, 45as45, and 45as110 is compared with measurement information at corresponding from the six-angle spectrophotometer. Differences between the sets of measurements are determined (such as Delta E), and a correction factor or correction function is determined and applied to the interstitial measurement geometries of 45as-15, 45as25, and 45as75 prior to their being added to the measurements of the target surface and calculation of a color table is performed.

Figure 15:
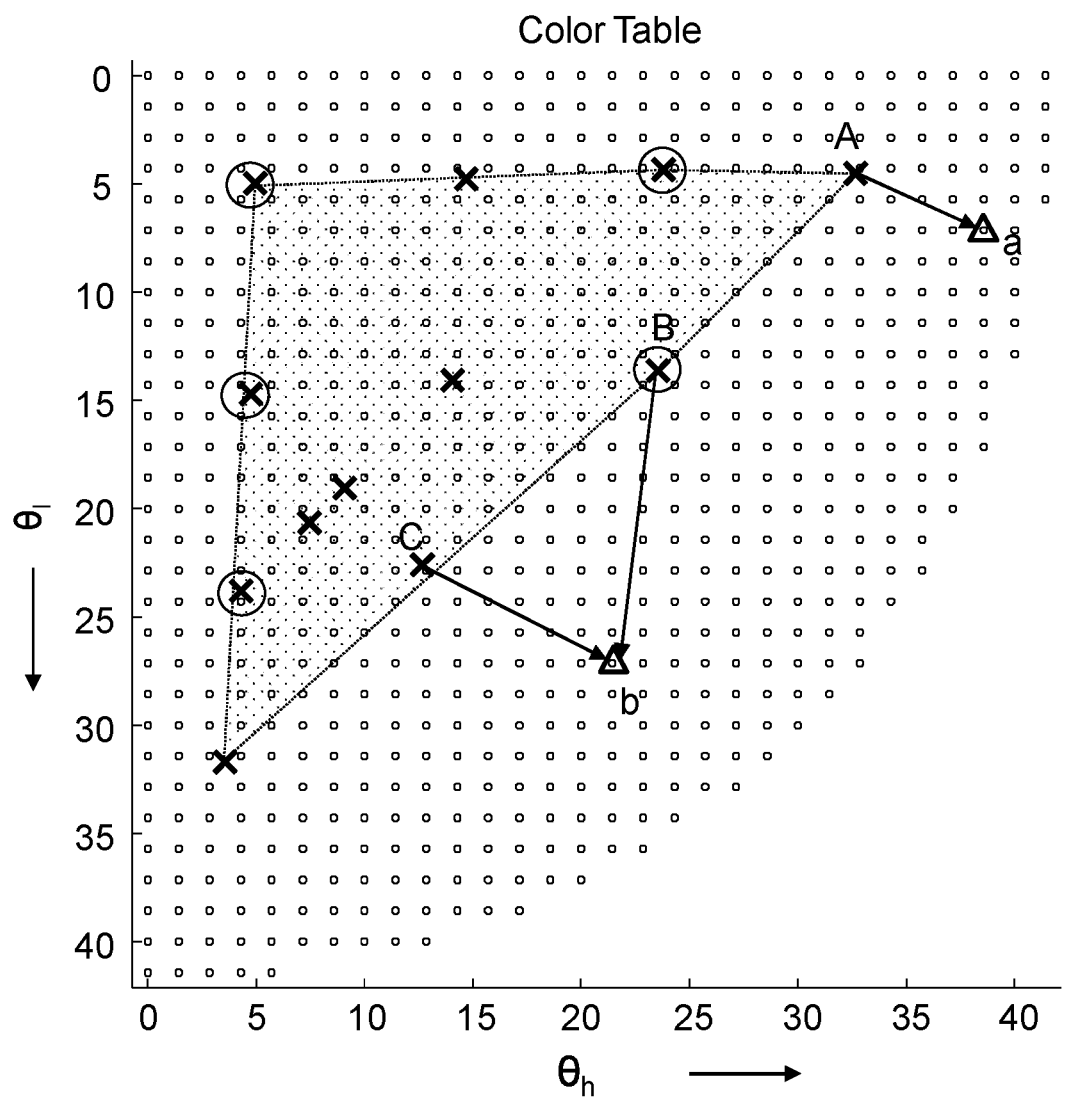
FIG. 15 shows a diagram illustrating a second exemplary discrete color table.

This may be extended to even further measurement geometries and combinations. For example, color and texture attributes of a target surface may be acquired by a six-angle spectrophotometer at measurement geometries of 45as-15, 45as15, 45as25, 45as45, 45as75 and 45as110. However, a reference material may be characterized with measurement geometries including 15as-45, 15as-15, 15as15, 15as45, 15as80. The measurements of the target surface may be augmented with measurements of the reference material at these additional measurements similarly as described above. In one example, as shown in FIG. 15, measurements at illumination and observation angles designated by a circled X are added or substituted into to a measurement set having additional measurement illumination and observation angles. The color table is calculated as described above with respect to FIG. 6. In such an example, destination positions a, b, and others may be interpolated from target surface measurements, from reference surface measurements, or a combination of target surface measurements and reference surface measurements.

While the foregoing example is provided in the context of a target surface having a low level of information relative to a reference material having a higher level of information, the invention is not so limited. The invention may be applied to any of the following examples where a target object, reference material, and trial object have different levels of information.

(c) Information Content is High for Target Object and Reference Materials, but Low for Trial Object (Box "H/L/H" in FIG. 14)

In some embodiments, image-based texture information is available for the target material and the reference materials, but no or only limited texture information (e.g., one or more global texture parameters or image information for only one pair or illumination and viewing directions) is available for the trial object. In this case, similar strategies as in case (b) can be pursued. In particular, the texture of the trial material may be predicted based on the known texture attributes associated with the target material and/or with the reference materials. Also, the texture may be predicted based on known texture data from constituent materials of the paint, such as texture information obtained from draw-downs of individual effect pigments.

(d) Information Content is Low for Target Object and Low for Trial Object, but High for Reference Materials (Box "L/L/H" in FIG. 14)

In some embodiments, image-based texture information is only available for the reference materials, while no or only limited texture information is available for the target object and for the trial object. In this case, again similar strategies as in case (b) can be pursued. In particular, the textures of the target material and the trial material may be predicted based on the known texture attributes associated with the reference materials. Additionally, color measurement sets may be combined and color tables calculated as in case (b).

(e) Information Content is High for Target Object and Trial Object, but Low for Reference Materials ("H/H/L", not Visible in FIG. 14)

In some embodiments, image-based texture information is available for both the target object and the trial object, but no texture information or only limited texture information is available for the reference materials. This may be the case, for instance, if a relatively old colorant database is used, which was filled at a time when only less sophisticated instrumentation was available, while more modern appearance capture devices are available for measuring the target material and the trial material.

In such a situation, the color and/or texture information of the target object and/or of the trial object (once the trial object has been produced) may be used to visualize the appearance of the candidate recipe. To this end, the associated second instance of the appearance model may be "edited", using texture information that belongs to the target material and/or to the trial material. This can be done in very much the same way in which the first instance of the appearance model is edited in case (b) discussed above.

It is advantageous to use the texture attributes of the trial object for visualizing the candidate recipes once these texture attributes are available, since it can safely be assumed that the relatively small differences between the composition of further candidate recipes and the trial material will influence texture only negligibly.

(f) Information Content is Low for Target Object and Reference Materials, but High for Trial Object ("L/H/L", not Visible in FIG. 14)

If image-based texture information is available for the trial material, while no or only limited texture information is available for the target material and the reference materials, the virtual object may be visualized without texture or using some generic textures as long as the trial object is not yet available. Once the trial object is available, the texture attributes of the trial object may then be used for visualizing the target material and the candidate recipes. To this end, the texture color attributes in the associated instances of the appearance models may be edited as described for case (b) above.

(g) Information Content is High for Target Object, but Low for Trial Object and Reference Materials (Box "H/L/L" in FIG. 14)

If image-based texture information is available for the target material, while no or only limited texture information is available for the trial material and for the reference materials, a similar strategy as for case (e) above may be pursued. Texture and color attributes of the target object may be used to visualize the appearance of the candidate recipe and the appearance of the trial object. To this end, the associated instances of the appearance model may be "edited", using texture information that belongs to the target material.

(h) Information Content is Low for Target Object, Trial Object, and Reference Materials (Box "L/L/L" in FIG. 14)

If no image-based texture information is available for any of the objects, the virtual object may be simply visualized without texture or using a generic texture for the class of materials to which the target object belongs.

Editing of Reflectance Values

In addition to combining measurements from instruments having different measurement geometries, as set forth above, a set of high information appearance data may be edited to include a set of low information appearance data measurements as described in U.S. 2015/0032430. In a general case of such editing, referring to FIG. 16, G denotes a high information (densely populated) BTF as measured for a first material, which may comprise but is not limited to a reference material $M_R$. For each pixel of the measured area of the first material and for a large number of illumination and viewing directions, G holds a set of reflectance values which can be e.g. RGB color values or spectral values. In the following sets of reflectance values may be referred to as reflectance values or color values.

To obtain the high information set of appearance data G, in some embodiments, a sufficiently large surface area of the first material $M_R$ is measured using a complex reflectance scanner 711 to provide a set of reflectance values for each pixel of the scanned surface area under a large number of illumination directions (at least 5, more preferably at least 10) and a large number of viewing directions (at least 5, more preferably at least 10). In other embodiments, the surface of the first materials is measured using a handheld multi-angle spectrophotometer 711a, and a high information, densely populated BTF database is interpolated or extrapolated 711b from the measurements as set forth more fully above. The result is a first set of data indicative of the values of measured appearance attributes of the $M_R$. This first set of data is also referred to herein as the densely populated original BTF database G 712 for the $M_R$.

In some embodiments, the first set of data G comprises a Bidirectional Texture Function (BTF), a Bi-Directional Scattering-Surface Reflectance Distribution Function (BSSRDF), Spatially Varying Bi-Directional Transmission Distribution Function (SVBTDF), or a Spatially Varying Bi-Directional Reflectance Distribution Function (SVBRDF).

H denotes a set of lower information ("sparsely captured") reflectance values of one measuring points or spots of a second material $M_S$ (i.e., a material other than the first material). The lower information reflectance values H comprise one or more sets of e.g. RGB values or other color values or spectral values. If the second material is measured under one specific illumination condition and in one specific viewing direction only a single set of reflectance values results. If the second material $M_S$ is measured under several illumination directions and/or viewing directions a plurality s of sets Hs results according to the number of combinations of illumination and viewing directions. Color and appearance measuring devices suitable for capturing sparse reflectance values include portable multi-angle spectrophotometers as disclosed herein. A measuring device for capturing said sparse reflectance values is referred to hereinafter also as a simple scanner. For the sake of completeness it is to be mentioned that the reflectance values H may also be taken, in practical use, from a database or from a suitable color chart or the like.

In one example, a measurement spot of a second material $M_S$ is measured using a simple reflectance scanner or color measuring device 713 to provide sparse reflectance values H 714. The result is a second set of data indicative of a value of at least one measured appearance attribute of the $M_s$. The appearance attribute of the $M_S$ includes at least one, but not all, of the appearance attributes measured on the $M_R$. The second set of data is also referred to herein as the "sparsely populated" data set. "Sparse" means less than at least 50% the amount in the densely populated BTF database G for the $M_R$. In some embodiments, the number of appearance attributes in the data collected from the $M_S$ is less than 1% of the number of appearance attributes represented in the BTF of the $M_R$.

The data acquisition steps are known per se and can be implemented by any suitable measurement equipment (including, for example, a spectrophotometer). The materials can be illuminated with electromagnetic (EM) radiation in the range of near IR, UV or humanly detectable frequency spectra. The BTF data G can be acquired at the same time or a different time than the BTF data H for the $M_s$. The BTF data B for the $M_R$ can be stored on the same computer or different computer used to store the data from the $M_s$.

Figure 16:
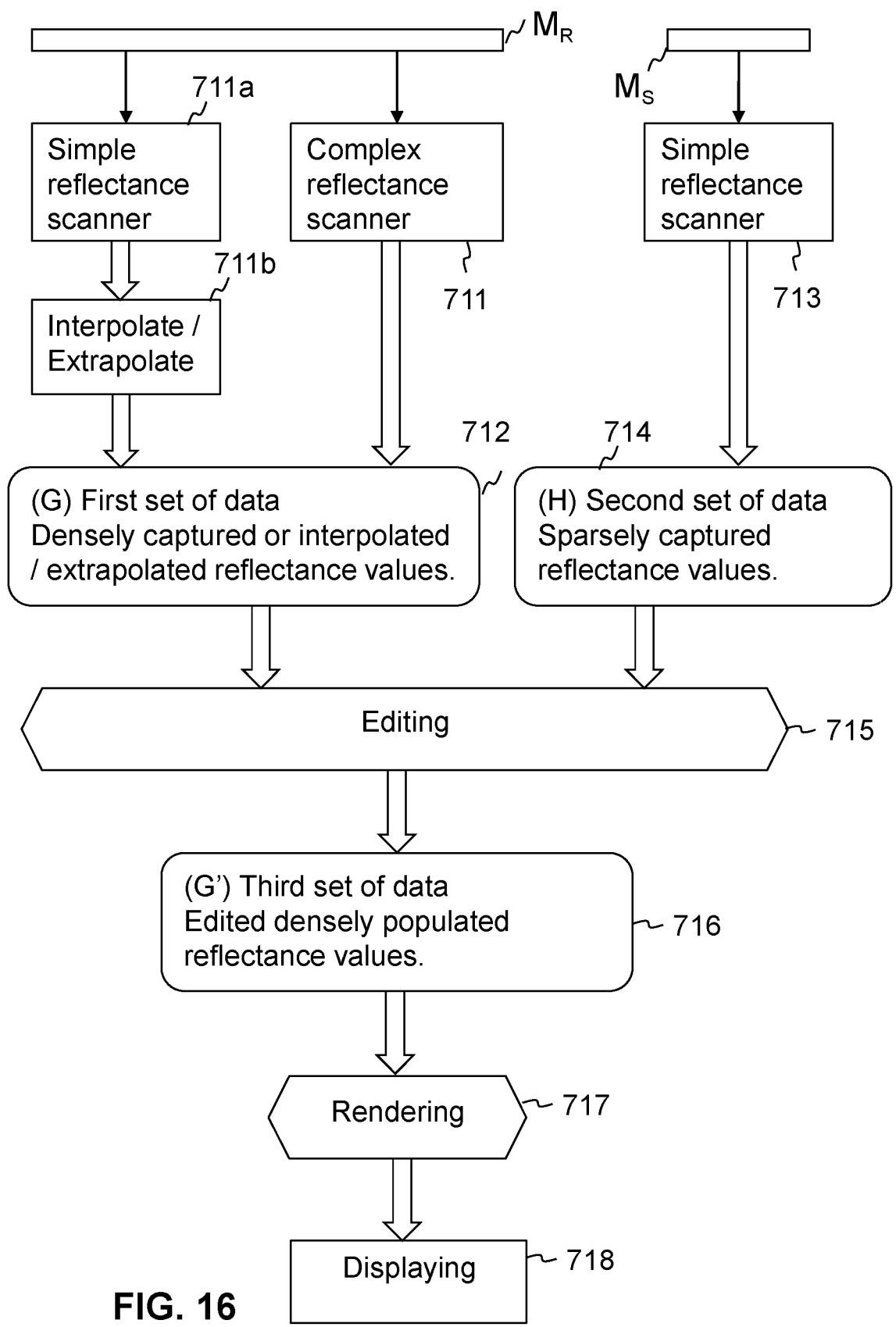
FIG. 16 shows a flow diagram for editing a set of appearance attributes.

With continuing reference to FIG. 16, G' denotes a high information (densely populated) BTF database derived from G by modifying the original BTF G with sparse reflectance values H. Modifying a BTF is also referred to as editing a BTF. The modified BTF G' represents a simulated material that combines appearance properties of both the first (e.g., reference) material and the second material.

As reflectance values H will be transferred to G, the reflectance values H have to be of the same type as those of G, i.e. RGB color values or spectral values or any other suitable color values. Otherwise either the reflectance values of G or preferably those of H have to be converted correspondingly.

In one example, the third set of data G' indicative of an appearance of the simulated material is determined based at least in part on data from the second set of data H associated with the $M_S$ and at least in part on data from the first set of data G associated with the $M_R$. In some embodiments, a new set of appearance attributes is synthesized from the BTF G of the $M_R$ and the sparse reflectance values H of $M_s$. The original BTF G of the $M_R$ is edited (modified) by transferring the sparse reflectance values H of the $M_S$ into the BTF G 715. In this synthesis step, a modified BTF G' is produced which is populated as densely as G but has reflectance values that make a visualization of G' to resemble the second material $M_s$, i.e. the reflectance values of G' are as similar as possible to reflectance values which would have been obtained if the BTF of the second material had been actually measured and characterized in a process yielding a high information appearance data set. This transfer may include data conversion, texture synthesis, and other transformation steps.

In some embodiments, the third set of data is determined based at least in part from data from the first and second data as well as data from a fourth set of data indicative of standardized values of appearance attributes representative of a family of generally similar physically tangible materials of which the first material or the second material is a member.

In some embodiments, the third set of data G' is corrected such that a visualization of the G' appearance data set more closely matches the appearance of the second material $M_s$. In some embodiments, an error value is used to correct the data. In one example, the error value consists of (a) the difference between a parameter of a measured appearance attribute of the second material and the same parameter of the corresponding appearance attribute in the third set of data and (b) a physical plausibility value based on the difference between at least one, preferably at least two, parameter(s) of between at least one, preferably at least two, measured appearance attribute(s) of the reference material and the same parameter(s) of the corresponding measured appearance attribute(s) in the third set of data. In some embodiments, if the error value is greater than a predetermined threshold, then the third set of data is revised until the error value is less than the predetermined threshold value.

The third set of data may optionally be processed to form an image representative of the synthesized appearance of the second material $M_s$. In some embodiments, the image may be 3-dimensional. FIG. 1 shows the third set of data (e.g., the edited BTF G') 716 can be fed as input data to a rendering engine 717 and visualized on a display 718. This may include any of the visualization techniques discussed above.

One application of the appearance data set editing techniques is in the field of automotive refinishing. As set forth above with respect to FIG. 14, different levels of appearance information may be available for visualizations at different stages of the refinish process. While the following example discusses and example where a reference material has a high information data set and a target surface has low information, the example may be combined with any of the examples of high information/low information appearance data sets provided above. Additionally, this aspect of the invention is not limited to uses where the appearance attribute data sets are uniformly higher or lower in information than each other. For example, one appearance data set may have high levels of color attributes, such as from a multi-angle spectrophotometer, but low or no texture information. Another data set may comprise high levels of texture attribute information from a draw-down of an effect pigment, but no color attribute information. Such data sets may be combined using the same techniques as described above.

In this specific application, it is noted that automotive paint materials typically are homogeneous up to the distortion by the sparkling due to certain pigments or flakes incorporated in the paints. Since automotive paints are near-homogeneous materials, the whole measured surface area of the reference material can be included into the editing process by setting P to the set of all pixels.

A reference surface of an automotive paint reference is measured and a high information appearance data set G is generated. As set forth more fully above, the BRDF of the surface is represented using an angular-dependent color table and a Cook-Torrance BRDF model. The residual contains the local effects caused by the flakes, e.g. sparkling, and is represented by a specially encoded BTF. A target surface, such as of an automobile to be repaired, is measured and a low information appearance data set H is generated.

This high information BTF G is then edited in three steps: (1) new parameters for the BRDF model are calculated by matching the gray-scale reflectances of appearance data set B with the given sparse reflectance values of appearance data set H; (2) the entries of color table are recomputed to match the colors to the sparse measured reflectance values H; and (3) the colors in all pixels of the flake BTF are changed to match the edit performed on the color table and the angular distribution of the images is changed according to the edit. If no spatial information is given in H, no sensible changes to the distribution of the flake effects within one image of the flake BTF are possible.

More specifically in the first step, new values for the diffuse and specular coefficients as well as the roughness parameters of the Cook-Torrance model are determined using optimization. For the second step, the original color table is first warped in angular domain based on the average surface roughness change. Since the bi-angular color change of metallic paints depends on the alignment of the flake particles, and since the roughness parameter reflects the degree of misalignment, this operation corrects for the difference in flake alignment between the source and target paint. Also, in the second step, a color operator is applied to the entries of the original color table to match the colors from H. This color operator depends on the color or spectral space in which the color table is defined. A typical transformation has just a few parameters. An example would be a hue and saturation change operator. In the third step, a modified flake BTF is created by applying the same angular warping and color transformation from the second step to all pixels of the flake BTF. The result is a modified appearance data set G'. Modified appearance data set G' is visualized along with reference appearance data set G using any of the appearance and/or object models disclosed herein.

REFERENCES

[Ber19] Roy S. Berns, "Billmeyer and Saltzman's Principles of Color Technology", 4$^{th}$ edition, Wiley, 2019, p. 184

[Kw03] Kwatra, V., Schödl, A., Essa, I., Turk, G. and Bobick, A., "Graphcut textures: image and video synthesis using graph cuts", ACM Transactions on Graphics (ToG), 2003, 22(3), pp. 277-286.

[MTG+19] Gero Müller, Jochen Tautges, Alexander Gress, Martin Rump, Max Hermann, and Francis Lamy, "AxF—Appearance exchange Format", Version 1.7, Apr. 11, 2019, available upon request from X-Rite, Inc.

[RMS+08] Martin Rump, Gero Müller, Ralf Sarlette, Dirk Koch and Richard Klein, "Photo-realistic Rendering of Metallic Car Paint from Image-Based Measurements", In: R. Scopigno, E. Gröller (eds.), Computer Graphics Forum, Eurographics, Apr. 2008, 27:2 (527-536)

[RSK09] Martin Rump, Ralf Sarlette and Richard Klein, "Efficient Resampling, Compression and Rendering of Metallic and Pearlescent Paint", In: M. Magnus, B. Rosenhahn, H. Theisel (ed.), Proceedings of Vision, Modeling, and Visualization, November 2009, pp. 11-18

[Rus98] Szymon M. Rusinkiewicz, "A New Change of Variables for Efficient BRDF Representation", In: G. Drettakis G., N. Max (eds.), Rendering Techniques '98, Eurographics, Springer, Vienna, 1998, https://doi.org/10.1007/978-3-7091-6453-2 2

[Sh68] Shepard, D., "A two-dimensional interpolation function for irregularly-spaced data", In: Proceedings of the 1968 23rd ACM national conference, 1968, pp. 517-524

[W98] Williams, C. K., "Prediction with Gaussian processes: From linear regression to linear prediction and beyond". In: Learning in graphical model, Springer, Dordrecht, 1998, pp. 599-621.

The invention claimed is:

1. A computer-implemented method for visualizing the appearances of at least two materials, the method comprising:
    obtaining a first set of appearance attributes, the appearance attributes of the first set being associated with a first material, the first set of appearance attributes comprising measured appearance attributes;
    obtaining a second set of appearance attributes, the appearance attributes of the second set being associated with a second material; and
obtaining a geometric model of at least one virtual object, the geometric model defining a three-dimensional macroscopic surface geometry of the virtual object;
    synthesizing a third set of appearance attributes from the first set of appearance attributes and the second set of appearance attributes; and
    visualizing, using a display device, a scene comprising the at least one virtual object, using the third set of appearance attributes, a comparison set of appearance attributes and the geometric model, a first portion of the at least one virtual object being visualized using the third set of appearance attributes, and a second portion of the at least one virtual object being visualized using the comparison set of appearance attributes, to allow a direct a visual comparison of the first set of appearance attributes as modified by the second set of appearance attributes with the comparison set of appearance attributes.

2. The computer-implemented method of claim 1, wherein the first set of appearance attributes comprises color attributes but lacks texture attributes;
    wherein the second set of appearance attributes comprises both color attributes and texture attributes, and wherein the third set of appearance attributes comprises a synthesis of color attributes from the first set of appearance attributes and texture attributes from the second set of appearance attributes.

3. The computer-implemented method of claim 1, wherein the first set of appearance attributes comprises a first plurality of color attributes corresponding to a first plurality of optical measurement geometries;
    wherein the second set of appearance attributes comprises a second plurality of color attributes corresponding to a second plurality of optical measurement geometries, the second plurality of measurement geometries being greater than the first plurality of measurement geometries; and wherein the third set of appearance attributes comprises a synthesis of color attributes from the first plurality of color attributes and the second plurality of color attributes.

4. The computer-implemented method of claim 3, wherein, in the third set of appearance attributes, the first plurality of color attributes are substituted for color attributes of the second plurality of color attributes at measurement geometries that match the first set of color attributes.

5. The computer-implemented method of claim 4, wherein, in the third set of appearance attributes, the color attributes of the second plurality of color attributes not replaced by the first plurality of color attributes are corrected to adjust for a color difference between the replacing color attributes and the replaced color attributes.

6. The computer-implemented method of claim 1, wherein the method further comprises:
generating a first instance of an appearance model, the first instance of the appearance model comprising the third set of appearance attributes; and
generating a second instance of the appearance model, the second instance of the appearance model comprising the comparison set of appearance attributes,
wherein the appearance model comprises a discrete texture table comprising a plurality of destination textures, each destination texture being represented by image data and being associated with a different set of destination coordinates, the set of destination coordinates being indicative of a particular combination of illumination and viewing directions, and
wherein the first and second instances of the appearance model are used for visualizing the at least one virtual object.

7. The computer-implemented method of claim 6, wherein generating the first instance of the appearance model comprises at least one of the following operations:
interpolating between available appearance attributes at different combinations of illumination and viewing directions; and
extrapolating from available appearance attributes at selected combinations of illumination and viewing directions;
wherein the available appearance attributes comprise appearance attributes from the third set of appearance attributes.

8. The computer-implemented method of claim 1,
wherein the first material comprises a target automotive paint and the first set of appearance attributes comprises measured appearance attributes of the target automotive paint;
wherein the second material comprises a reference automotive paint and the second set of appearance attributes comprises measured appearance attributes of the reference automotive paint; and
wherein the comparison set of appearance attributes comprises the second set of appearance attributes.

9. The computer-implemented method of claim 1,
wherein the first material comprises a target automotive paint and the first set of appearance attributes comprises measured appearance attributes of the target automotive paint;
wherein the second material comprises a candidate recipe for automotive paint and the second set of appearance attributes comprises calculated appearance attributes of the candidate recipe; and wherein the comparison set of appearance attributes comprises the second set of appearance attributes.

10. The computer-implemented method of claim 1,
wherein the first material comprises a test object automotive paint and the first set of appearance attributes comprises measured appearance attributes of the test object; and
wherein the second material comprises a reference automotive paint and the second set of appearance attributes comprises measured appearance attributes of the reference automotive paint; and
wherein the comparison set of appearance attributes comprises the second set of appearance attributes.

11. The computer-implemented method of claim 1, wherein the first material comprises a candidate automotive paint formulation and the first set of appearance attributes comprises measured appearance attributes of the candidate automotive paint formulation;
wherein the second material comprises a target automotive paint and the second set of appearance attributes comprises measured appearance attributes of the target automotive paint and
wherein the comparison set of appearance attributes comprises the second set of appearance attributes.

12. The computer-implemented method of claim 1, wherein the third set of appearance attributes further comprises appearance attributes from a fourth set of appearance attributes.

13. The computer-implemented method of claim 12, wherein the fourth set of appearance attributes comprises appearance attributes from a drawdown of one or more pigments associated with a paint formulation.

14. The computer-implemented method of claim 1, wherein the second set of appearance attributes comprises appearance attributes from a drawdown of one or more pigments associated with a paint formulation.

15. The computer-implemented method of claim 1, wherein the second set of appearance attributes comprises calculated appearance attributes corresponding to one or more pigments associated with a paint formulation.

16. A computer-implemented method for visualizing the appearances of at least two materials, the method comprising:
obtaining a set of target appearance attributes, the target appearance attributes being associated with a target material, the target set of appearance attributes comprising measured appearance attributes;
generating a first instance of an appearance model, the first instance of the appearance model comprising the set of target appearance attributes;
obtaining a second instance of the appearance model, the second instance of the appearance model comprising a set of reference material appearance attributes;
modifying the first instance of the appearance model with appearance attributes from the reference material to obtain a modified first instance of the appearance model;
obtaining a geometric model of at least one virtual object, the geometric model defining a three-dimensional macroscopic surface geometry of the virtual object; and
visualizing, using a display device, a scene comprising the at least one virtual object, using the modified first instance of the appearance model, the second instance of the appearance model, and the geometric model, a first portion of the at least one virtual object being visualized using the modified first instance of the appearance model, and a second portion of the at least one virtual object being visualized using the second instance of the appearance model, to allow a direct a visual comparison of the modified first instance of the appearance model with the second instance of the appearance model.

17. The computer-implemented method of claim 16, wherein the appearance model comprises a discrete texture table comprising a plurality of destination textures, each destination texture being represented by image data and being associated with a different set of destination coordinates, the set of destination coordinates being indicative of a particular combination of illumination and viewing directions.

18. The computer-implemented method of claim 16, wherein the set of target appearance attributes comprise sparsely captured reflectance values.

19. The computer-implemented method of claim 16 wherein the modified first instance of the appearance model is a model selected from a group consisting of a Bidirectional Texture Function (BTF), a Bi-Directional Scattering-Surface Reflectance Distribution Function (BSSRDF), a Spatially Varying Bi-Directional Transmission Distribution Function (SVBTDF), and a Spatially Varying Bi-Directional Reflectance Distribution Function (SVBRDF).

\* \* \* \* \*